(12) United States Patent
Matsui et al.

(10) Patent No.: US 11,007,848 B2
(45) Date of Patent: May 18, 2021

(54) INFORMATION PROCESSING METHOD

(71) Applicant: Panasonic Intellectual Property Corporation of America, Torrance, CA (US)

(72) Inventors: Shuhei Matsui, Osaka (JP); Takahiro Yoneda, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 17 days.

(21) Appl. No.: 16/511,688

(22) Filed: Jul. 15, 2019

(65) Prior Publication Data

US 2020/0023710 A1    Jan. 23, 2020

(30) Foreign Application Priority Data

Jul. 20, 2018 (JP) .............................. JP2018-136660

(51) Int. Cl.
 *B60H 1/00* (2006.01)
(52) U.S. Cl.
 CPC ..... *B60H 1/00985* (2013.01); *B60H 1/00657* (2013.01)
(58) Field of Classification Search
 CPC ............ B60H 1/00657; B60H 1/00985; G06K 9/6267; G06Q 10/02; G06Q 30/06
 See application file for complete search history.

(56) References Cited

U.S. PATENT DOCUMENTS

| | | | |
|---|---|---|---|
| 2007/0276595 A1* | 11/2007 | Lewinson | G01C 21/3484 701/533 |
| 2014/0180746 A1* | 6/2014 | Lehmann | G06Q 10/1093 705/7.18 |
| 2015/0370253 A1 | 12/2015 | Gurin | |
| 2018/0126960 A1 | 5/2018 | Reibling et al. | |
| 2018/0211352 A1* | 7/2018 | Lim | G06Q 10/02 |

FOREIGN PATENT DOCUMENTS

| | | |
|---|---|---|
| DE | 10 2013 001 332 | 7/2014 |
| JP | 4-8660 | 1/1992 |
| JP | 2013-54537 | 3/2013 |
| JP | 2013-54538 | 3/2013 |
| JP | 2013-191053 | 9/2013 |

OTHER PUBLICATIONS

Extended European Search Report dated Oct. 16, 2019 in corresponding European Patent Application No. 19184854.8.

* cited by examiner

*Primary Examiner* — Omeed Alizada
(74) *Attorney, Agent, or Firm* — Wenderoth, Lind & Ponack, L.L.P.

(57) ABSTRACT

An information processing method includes the following executed by a computer: obtaining first attribute information that indicates an attribute of a first user concerning an internal space of a moving body, and vacancy information of at least one moving body; generating presentation information for a second user using the first attribute information and the vacancy information, the presentation information indicating, in accordance with the attribute of the first user, at least one of a vacant moving body and vacant seats among the at least one moving body; and causing a presentation apparatus to present the presentation information.

12 Claims, 26 Drawing Sheets

FIG. 2

| VEHICLE ID ~1010 | SEAT ~1020 | DIRT LEVEL ~1030 | TRASH ~1040 | WETNESS ~1050 | ODOR ~1060 | STATE ~1070 | INITIAL STATE ~1080 |
|---|---|---|---|---|---|---|---|
| carA | A-1 | level 1 | level 1 | level 1 | level 1 | NORMAL | carA-1.png |
| | A-2 | level 5 | level 3 | level 2 | level 1 | TORN | carA-2.png |
| | A-3 | level 3 | level 2 | level 1 | level 2 | NORMAL | carA-3.png |
| ... | ... | ... | ... | ... | ... | ... | ... |

FIG. 3

| RESERVATION ID ~1110 | USER ID ~1120 | TIME AND DATE OF USAGE ~1130 | DIRT LEVEL AT TIME OF RESERVATION ~1140 | DIRT LEVEL AT TIME OF BOARDING ~1150 | DIRT LEVEL AT TIME OF ALIGHTING ~1160 | TEMPERATURE SET IN VEHICLE ~1170 | IN-VEHICLE CALLS ~1180 | ODOR LEVEL ~1190 | ... |
|---|---|---|---|---|---|---|---|---|---|
| H-reserve-0001 | userA | 2017/11/01/12:10 | level 1 | level 1 | level 1 | 20°C | YES | Level 2 | ... |
| H-reserve-0002 | userA | 2017/11/01/12:50 | level 1 | level 1 | level 2 | 21°C | YES | Level 3 | ... |
| H-reserve-0003 | userA | 2017/11/21/10:04 | level 2 | level 2 | level 2 | 19°C | NO | Level 4 | ... |
| ... | ... | ... | ... | ... | ... | ... | ... | ... | ... |

FIG. 4

| USER ID | RESERVATION TENDENCY ANALYSIS RESULT | USAGE TENDENCY ANALYSIS RESULT | TOLERANCE | AVERAGE TEMPERATURE SET IN VEHICLE | IN-VEHICLE CALLS | ODOR LEVEL |
|---|---|---|---|---|---|---|
| userA | level 1 | level 0 | level 1 | 20°C | 1 | 2 |
| userB | level 4 | level 2 | level 2 | 18°C | 0 | 1 |
| userC | UNDEFINED | UNDEFINED | UNDEFINED | 22°C | 0 | 4 |
| ... | ... | ... | ... | ... | ... | ... |

FIG. 22

| USER ID | VECHICLE ID | ATTRIBUTE 1 (j=1) | ATTRIBUTE 2 (j=2) | ATTRIBUTE 3 (j=3) | ... | ATTRIBUTE M (j=M) |
|---|---|---|---|---|---|---|
| userA | UNDEFINED | 1 | 0 | 1 | ... | 5 |

FIG. 23

| USER ID | VECHICLE ID | SMOKER 0: NO 1: YES | OPEN WINDOW 0: NO 1: YES | SEAT TENDENCY 0: FRONT 1: BACK | ... | HOW EASY USER MAKES MOVING BODY DIRTY Level: 1-5 |
|---|---|---|---|---|---|---|
| userA | UNDEFINED | 1 | 0 | 1 | ... | 5 |

FIG. 24

| USER ID | VECHICLE ID | ATTRIBUTE 1 (j=1) | ATTRIBUTE 2 (j=2) | ATTRIBUTE 3 (j=3) | ... | ATTRIBUTE M (j=M) |
|---|---|---|---|---|---|---|
| user1 (i=1) | carA | 1 | 1 | 1 | ... | 4 |
| user2 (i=2) | carB | 0 | 1 | 1 | ... | 2 |
| user3 (i=3) | carC | 1 | 0 | 1 | ... | 3 |
| ⋮ | ⋮ | ⋮ | ⋮ | ⋮ | ... | ⋮ |
| userX (i=N) | carX | 0 | 0 | 0 | ... | 5 |

FIG. 25

|  | ATTRIBUTE 1 (j=1) | ATTRIBUTE 2 (j=2) | ATTRIBUTE 3 (j=3) | ... | ATTRIBUTE M (j=M) |
|---|---|---|---|---|---|
| EVALUATION FORMULA: $f_j(x_1,x_2)$ | $f(x_1,x_2) = \|x_1-x_2\|$ | $f(x_1,x_2) = \begin{cases} 0, (x_1 \neq x_2) \\ 1, (x_1 = x_2) \end{cases}$ | $f(x_1,x_2) = \begin{cases} 0, (x_1 = x_2) \\ 1, (x_1 \neq x_2) \end{cases}$ | ... | $f(x_1,x_2) = \|x_1-x_2\|/4$ |
| WEIGHT: W[j] | 1 | 2 | 1 | ... | 0 |
| MEANING OF EVALUATION FORMULA | EVALUATION ON DEGREE | EVALUATION ON DISCORDANCE | EVALUATION ON ACCORDANCE | ... | EVALUATION ON DEGREE, NORMALIZATION OF EVALUATION |

INFORMATION PROCESSING METHOD

CROSS REFERENCE TO RELATED APPLICATION

This application claims the benefit of priority of Japanese Patent Application Number 2018-136660 filed on Jul. 20, 2018, the entire content of which is hereby incorporated by reference.

BACKGROUND

1. Technical Field

The present disclosure relates to an information processing method concerning information about a moving body.

2. Description of the Related Art

A technique for providing a moving body to a user wishing to use the moving body is conventionally known (e.g. see Japanese Unexamined Patent Application Publication No. 2013-54537).

With the conventional technique, however, it is difficult for at least one user among a plurality of users to comfortably use a moving body when an attribute of the moving body differs in between usage of the same moving body by the plurality of users.

Accordingly, the present disclosure aims to provide an information processing method that enables users with different attributes to comfortably use the moving body in a service in which a plurality of users use the same moving body.

SUMMARY

An information processing method according to an aspect of the present disclosure includes the following executed by a computer: obtaining first attribute information that indicates an attribute of a first user concerning an internal space of a moving body, and vacancy information of at least one moving body; generating presentation information for a second user using the first attribute information and the vacancy information, the presentation information indicating, in accordance with the attribute of the first user, at least one of a vacant moving body and vacant seats among the at least one moving body; and causing a presentation apparatus to present the presentation information.

An information processing method according to an aspect of the present disclosure enables users with different attributes to comfortably use a moving body in a service in which a plurality of users use the same moving body.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a data structure diagram showing an example of moving body information according to the embodiment;

FIG. 3 is a data structure diagram showing an example of record information according to the embodiment;

FIG. 4 is a data structure diagram showing an example of attribute information according to the embodiment;

FIG. 22 is a data structure diagram showing an example of attribute information of a user wishing to use a moving body according to the embodiment;

FIG. 23 is a data structure diagram showing an example of the attribute information of the user wishing to use the moving body according to the embodiment;

FIG. 24 is a data structure diagram showing an example of attribute information of possible ridesharing users according to the embodiment;

FIG. 25 is a correspondence table showing an example of a correspondence relationship between attributes, evaluation formulas, and weights according to the embodiment;

DETAILED DESCRIPTION OF THE EMBODIMENTS

Figure 1:
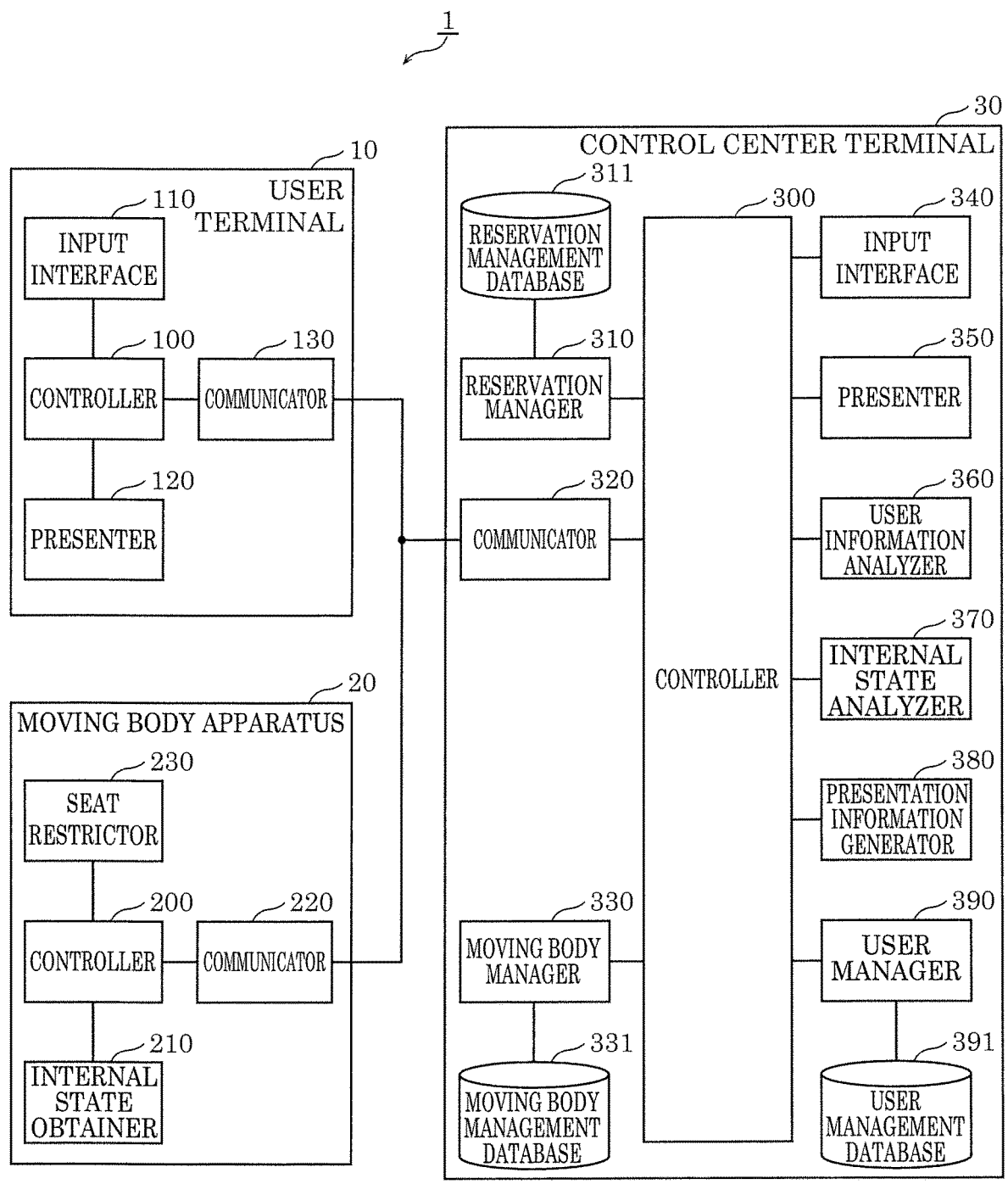
FIG. 1 is a block diagram showing a configuration of an information presentation system according to an embodiment.

Circumstances Leading Up to Aspect of Present Disclosure

In recent years, ridesharing services using moving bodies have been provided.

Conventional moving body ridesharing services do not take into consideration an attribute of a user concerning an internal space of a moving body when matching users sharing the same moving body.

Attributes (e.g. comfortable temperature range inside the moving body, types of unpleasant odors inside the moving body) of users using a moving body generally differ. Accordingly, when making use of a ridesharing service using a moving body, one or both users may have an unpleasant experience using the moving body when matched with a ridesharing user sharing the same moving body that has different attributes.

The user having the unpleasant experience will have to continue using the moving body while being displeased. Accordingly, the user may get a bad impression of an operator of the ridesharing service.

The inventors, keeping in mind this type of problem, have conceived an information processing method according to an aspect of the present disclosure that enables users with different attributes to each comfortably use a moving body in a service in which a plurality of users use the same moving body.

An information processing method according to an aspect of the present disclosure includes the following executed by a computer: obtaining first attribute information that indicates an attribute of a first user concerning an internal space of a moving body, and vacancy information of at least one moving body; generating presentation information for a second user using the first attribute information and the vacancy information, the presentation information indicating, in accordance with the attribute of the first user, at least one of a vacant moving body and vacant seats among the at least one moving body; and causing a presentation apparatus to present the presentation information.

In the above information processing method, at least one of a vacant moving body and vacant seats are presented for the second user wishing to use the moving body that is being shared in accordance with the attribute of the first user. This enables the second user to select a moving body that suitably matches their own attribute when using a moving body that is being shared. In this manner, the above information processing method enables users with different attributes to comfortably use a moving body in a service in which a plurality of users use the same moving body. For example, by matching users using a ridesharing service that uses moving bodies, it is possible to achieve more suitable matches than before. Since the information presented to the second user is in accordance with the attribute of the first user, repeated matching requests from the second user decrease, and as a result, memory capacity necessary for the presentation or throughput of the processor can be reduced.

The method may include obtaining second attribute information that indicates an attribute of the second user concerning the internal space of the moving body; and generating, further using the second attribute information, the presentation information in accordance with a relationship between the attribute of the first user and the attribute of the second user. This makes it possible to present a moving body also in accordance with the attribute of the second user without the need for the second user to make any judgments themselves. Since the information presented to the second user is the moving body or seat in a state suited to the attribute of the second user, the amount of presentation information is reduced, and memory capacity necessary for the presenting or the throughput of the processor can also be reduced.

The method may include generating the presentation information with a moving body reserved by the first user as subject, the relationship fulfilling a predetermined condition for the first user. This makes it possible to present to the second user a moving body reserved by a first user that has an attribute suited to the attribute of the second user.

The method may include generating, with the moving body reserved by the first user as subject, the presentation information that indicates, in accordance with a degree of the relationship, the at least one of the vacant moving body and the vacant seats. This makes it possible to present a compatibility degree with the attribute of the second user concerning the moving body to be presented, and enables the second user to choose a moving body or seat more suited to themselves.

The presentation information may include the first attribute information. This enables the second user to understand the attribute of the first user, and to choose a moving body or seat more suited to themselves.

The attribute of the first user and the attribute of the second user may include a tolerance toward a state of the internal space of the moving body. This makes it possible to allow users to be matched that are tolerant toward similar states.

The attribute of the first user and the attribute of the second user may include an attribute of behavior that changes a state of the internal space of the moving body. This makes it possible to allow users to be matched with similar behavior, i.e., that are tolerant toward states resulting from that behavior.

The state of the internal space of the moving body may include at least one of dirt, odor, brightness, sound, vibration, and temperature. This makes it possible to allow users to be matched using the attribute of the user concerning the state that is emphasized of the usage of the moving body, and to limit leaving a bad impression on the users, cancellations, or the like.

The attribute of the first user may include a tolerance toward a state of the internal space of the moving body, the attribute of the second user may include an attribute of behavior that changes the state of the internal space of the moving body, and the method may include generating the presentation information with a moving body other than a moving body reserved by the first user as subject when the attribute of the second user is the attribute of behavior that changes the state of the internal space of the moving body to a state that the first user has a low tolerance toward. This makes it possible to avoid the second user and the first user to be matched when the first user may be displeased.

The attribute of the first user may include an attribute of behavior that changes a state of the internal space of the moving body, the attribute of the second user may include a tolerance toward the state of the internal space of the moving body, and the method may include generating the presentation information with a moving body other than a moving body reserved by the first user as subject when the attribute of the second user is the attribute of behavior that changes the state of the internal space of the moving body to a state that the first user has a low tolerance toward. This makes it possible to avoid the first user and the second user to be matched when the second user may be displeased.

The method may include obtaining state information that indicates a state of the internal space of the at least one moving body; and generating the presentation information with a moving body as subject in which the state of the internal space corresponds to at least one of the attribute of the first user and the attribute of the second user. This makes it possible to present a moving body or seat suited to the second user in accordance with the actual state of the moving body.

The method may include generating the first attribute information from a usage history of the at least one moving body by the first user; and generating the second attribute information from a usage history of the at least one moving body by the second user. This makes it possible to present the presentation information in accordance with more accurate attributes of the user.

The method may include generating the first attribute information from a state of the internal space of the at least one moving body before and after usage by the first user; and generating the second attribute information from a state of the internal space of the at least one moving body before and after usage by the second user. This makes it possible to generate attribute information based on actual usage records, and to make the attribute of the user more accurate.

Hereinafter, a specific example of an information processing method according to an aspect of the present disclosure will be described with reference to the drawings. The subsequent embodiments show a specific example in the present disclosure. Therefore, numerical values, shapes, components, placement and connection of the components, steps (processes) and order of steps, and the like are mere examples and are not intended to limit the present disclosure. Components according to the following embodiments not mentioned in any of the independent claims are described as optional additional components. Moreover, the drawings are schematic diagrams and do not necessarily provide strictly accurate illustrations.

Note that this comprehensive or concrete aspect of the present disclosure may be realized on a device, integrated circuit, computer program, or a recording medium such as a computer-readable CD-ROM, and may also be realized by optionally combining devices, integrated circuits, computer programs, and recording media.

Embodiment

Hereinafter, a system that presents information according to an embodiment will be described. This information presentation system matches users using a ridesharing service that uses moving bodies.

The moving body used in the ridesharing service is described as an automated vehicle that can be simultaneously boarded by a plurality of users, but is not necessarily limited thereto as long as the moving body can be simultaneously boarded by the plurality of users. The moving body the plurality of users can board is, for example, a taxi with a driver present, bus, express train with reserved seats, and the like.

1. Configuration of Information Presentation System

FIG. 1 is a block diagram showing a configuration of information presentation system 1 according to the embodiment.

As illustrated in FIG. 1, information presentation system 1 includes user terminal 10, moving body apparatus 20, and control center terminal 30.

User terminal 10 is, for example, used by a user of information presentation system 1. In FIG. 1, user terminal 10 is depicted as a single unit, but the number of user terminals 10 is not necessarily limited thereto and may be any number.

User terminal 10 includes controller 100, input interface 110, presenter 120, and communicator 130. User terminal 10 may be, for example, a smartphone and may also be a tablet terminal.

Input interface 110 receives an input from the user that uses user terminal 10. Input interface 110 includes, for example, a touchpad, and may receive an input through a touch operation by the user that uses user terminal 10. Input interface 110 includes, for example, input keys, and may also receive an input through a key operation by the user that uses user terminal 10. Input interface 110 includes, for example, a microphone, and may also receive an input through speech by the user that uses user terminal 10.

Presenter 120 presents information to the user that uses user terminal 10. Presenter 120 includes, for example, a liquid-crystal display (LCD), and may present information by displaying an image to the user that uses user terminal 10. Presenter 120 includes, for example, a speaker, and may present information by outputting speech to the user that uses user terminal 10.

Communicator 130 communicates with other communicable devices. The other devices include moving body apparatus 20 and control center terminal 30. Communicator 130 includes, for example, a wireless communicator, and may wirelessly communicate with the other devices.

Controller 100 controls input interface 110, presenter 120, and communicator 130. Controller 100 may, for example, be realized by dedicated hardware. User terminal 10 includes, for example, a processor and memory, and may be realized by the processor executing a program stored in the memory.

Moving body apparatus 20 is, for example, installed in the moving body. In FIG. 1, moving body apparatus 20 is depicted as a single unit, but the number of moving body apparatuses 20 is not necessarily limited thereto and may be any number.

Moving body apparatus 20 includes controller 200, internal state obtainer 210, communicator 220, and seat restrictor 230.

Internal state obtainer 210 senses an internal space of the moving body installed in moving body apparatus 20, and outputs state information that indicates a state of the internal space of the moving body detected from a sensing result. Internal state obtainer 210 includes, for example, an imaging apparatus such as a digital video camera or digital still camera, may capture an image of the internal space of the moving body (e.g. seats), and output the captured image as the state information. In this case, the imaging apparatus may, for example, capture the image using visible light and output the visible light image as the state information; and may also capture an image using infrared light and output the infrared light image as the state information. The imaging apparatus may also capture a range image using visible light or infrared light and output the range image as the state information. Internal state obtainer 210 may, for example, include an odor sensor, sense an odor in an interior of the moving body, and output information that indicates the sensed odor as the state information. Internal state obtainer 210 may include a directional microphone, convert the speech of the interior of the moving body to a speech signal that is an electric signal, and output the converted speech signal as the state information.

Communicator 220 communicates with other communicable devices. The other devices include moving body apparatus 10 and control center terminal 30. Communicator 220 includes, for example, a wireless communicator, and may wirelessly communicate with the other devices.

Seat restrictor 230 switches the seats in the moving body, in which moving body apparatus 20 is installed, between an unlocked state in which the seat can be used and a locked state in which the seat cannot be used. More specifically, seat restrictor 230 performs a seat restriction reflection process in which the seats in the moving body are switched between the locked state and the unlocked state. The seat restriction reflection process will be described in more detail later with reference to the drawings. Seat restrictor 230 may, for example, include a cover fitting apparatus that fits the seats in the moving body with a removable seat cover stating that the seat cannot be used, and switch the seat to the locked state by fitting the seat with the cover or switch the seat to the unlocked state by removing the cover from the seat.

Controller 200 controls internal state obtainer 210, communicator 220, and seat restrictor 230. Controller 200 may, for example, be realized by dedicated hardware. Moving body apparatus 20 includes, for example, a processor and memory, and may be realized by the processor executing a program stored in the memory.

Control center terminal 30 is, for example, used by an operator that operates information presentation system 1.

Control center terminal 30 includes controller 300, reservation manager 310, reservation management database 311, communicator 320, moving body manager 330, moving body management database 331, input interface 340, presenter 350, user information analyzer 360, internal state analyzer 370, presentation information generator 380, user manager 390, and user management database 391. Control center terminal 30 may be, for example, a computer.

Moving body management database 331 stores state information obtained from moving body apparatus 20, moving body information that indicates a state of the interior of the moving body generated based on the state information, and vacancy information that indicates a vacant moving body and seats of the moving body. Moving body management database 331 may be realized, for example, by a hard disk in control center terminal 30, a removable digital versatile disc (DVD) in control center terminal 30, a memory contained in control center terminal 30, and a removable USB memory in control center terminal 30.

FIG. 2 is a data structure diagram showing an example of the moving body information stored in moving body management database 331.

As illustrated in FIG. 2, the moving body information corresponds to vehicle ID 1010, seat 1020, dirt level 1030, trash 1040, wetness 1050, odor 1060, state 1070, and initial state 1080.

Vehicle ID 1010 is information that identifies a vehicle that is an example of the moving body. Seat 1020 is information that indicates a seat included in the vehicle identified by the corresponding vehicle ID 1010. Dirt level 1030 is information that indicates a degree of dirt on the corresponding seat. Dirt level 1030 is expressed with six degrees level 1 to level 6 that indicate a higher level of dirt as the number is higher. Trash 1040 is information that indicates a degree of trash on the corresponding seat. Trash 1040 is expressed with six degrees level 1 to level 6 that indicate a higher level of trash as the number is higher. Wetness 1050 is information that indicates a degree of wetness of the corresponding seat. Wetness 1050 is expressed with six degrees level 1 to level 6 that indicate a higher level of wetness as the number is higher. Odor 1060 is information that indicates a degree of odor of the corresponding seat. Odor 1060 is expressed with six degrees level 1 to level 6 that indicate a stronger odor as the number is higher. State 1070 is information that indicates the state of the corresponding seat. State 1070 is information that indicates either one of the seat being in a normal state or the seat being torn. Initial state 1080 is an image of the initial state of the corresponding seat. The initial state refers to a possible seat without any trash, wet stains or tears.

Returning to FIG. 1, information presentation system 1 will be further described.

Moving body manager 330 updates and manages moving body management database 331. Moving body manager 330 may, for example, be realized by dedicated hardware. Control center terminal 30 includes, for example, a processor and memory, and may be realized by the processor executing a program stored in the memory.

Reservation management database 311 stores record information including reservation information of the moving body and a usage record of the user. Reservation management database 311 may be realized, for example, by a hard disk in control center terminal 30, a removable DVD in control center terminal 30, a memory contained in control center terminal 30, and a removable USB memory in control center terminal 30.

FIG. 3 is a data structure diagram showing an example of the record information stored in reservation management database 311.

As illustrated in FIG. 3, the record information corresponds to, for example, reservation ID 1110, user ID 1120, time and date of usage 1130, dirt level at time of reservation 1140, dirt level at time of boarding 1150, dirt level at time of alighting 1160, temperature set in vehicle 1170, in-vehicle calls 1180, and odor level 1190.

Reservation ID 1110 is information that identifies a reservation for usage of the moving body. User ID 1120 is information that identifies a user that has made a reservation that is identified with a corresponding reservation ID. Time and date of usage 1130 is information that indicates a time and date when the reservation, which is identified with the corresponding reservation ID, is made. Dirt level at time of reservation 1140 is information that indicates a level of dirt of seats that can be reserved at the moment the reservation, which is identified with the corresponding reservation ID, is made. Dirt level at time of reservation 1140 is expressed with six degrees level 1 to level 6 that indicate a higher level of dirt as the number is higher, similar to dirt level 1030. Dirt level at time of boarding 1150 is information that indicates a level of dirt of seats that can be reserved at the moment the user, which is identified with a corresponding user ID, boards the moving body that includes the seats that can be reserved of the reservation, which is identified with the corresponding reservation ID. Dirt level at time of boarding 1150 is expressed with six degrees level 1 to level 6 that indicate a higher level of dirt as the number is higher, similar to dirt level 1030. Dirt level at time of alighting 1160 is information that indicates a level of dirt of seats that can be reserved at the moment the user, which is identified with the corresponding user ID, alights from the moving body that includes the seats that can be reserved of the reservation, which is identified with the corresponding reservation ID. Dirt level at time of alighting 1160 is expressed with six degrees level 1 to level 6 that indicate a higher level of dirt as the number is higher, similar to dirt level 1030. Temperature set in vehicle 1170 is information that indicates an in-vehicle temperature set in the moving body that includes the seats that can be reserved for the reservation, which is identified with the corresponding reservation ID. In-vehicle calls 1180 is information that indicates whether calls, e.g. with a cell phone, have been made in the moving body including the seats that can be reserved for the reservation, which is identified with the corresponding reservation ID. In-vehicle calls 1180 expresses either one of calls having been made or calls not having been made. Odor level 1190 is information that indicates an odor level in the internal space of the moving body including the seats that can be reserved for the reservation, which is identified with the corresponding reservation ID. Odor level 1190 is expressed with six degrees level 1 to level 6 that indicate a stronger odor as the number is higher. Note that reservation tendency analysis result 1220, usage tendency analysis result 1230, and tolerance 1240 are not limited to ascending (or descending) numerical values that indicate the level of dirt, and may also be indices that can distinguish the different degrees of dirt. These may be determined from one usage or collectively determined from multiple usages.

Returning to FIG. 1, information presentation system 1 will be further described.

Reservation manager 310 updates and manages reservation management database 311. Reservation manager 310 may, for example, be realized by dedicated hardware. Control center terminal 30 includes, for example, a processor and memory, and may be realized by the processor executing a program stored in the memory.

User management database 391 stores attribute information that indicates an attribute of the user concerning the internal space of the moving body. The attribute information that indicates the attribute of the user concerning the internal space of the moving body may also include the attribute of behavior that changes the state of the internal space of the moving body. The state of the internal space of the moving body corresponds to, for example, dirt, an odor, brightness, sound, vibration, a temperature, and the like. The attribute of the user concerning the internal space of the moving body may be, for example, an attribute relating to the brightness inside the vehicle, an attribute relating to air conditioning (in-vehicle temperature, air flow), an attribute relating to opening and closing of windows, attributes relating to an odor in the vehicle, an attribute relating to dirt, damage, etc. in the vehicle, and an attribute relating to individual characteristics. The attribute relating to individual characteristics may be, for example, characteristics relating to a presence of an odor, characteristics relating to sound leaking from headphones and the like, characteristics relating to particular behavior (leg shaking, leg crossing), and characteristics relating to choosing seat position, but the above examples are not limited thereto as long as the characteristics affect the user in an enclosed space. User management database 391 may be realized, for example, by a hard disk in control center terminal 30, a removable DVD in control center terminal 30, a memory contained in control center terminal 30, and a removable USB memory in control center terminal 30.

FIG. 4 is a data structure diagram showing an example of the attribute information stored in user management database 391.

As illustrated in FIG. 4, the attribute information corresponds to, for example, user ID 1210, reservation tendency analysis result 1220, usage tendency analysis result 1230, tolerance 1240, average temperature set in vehicle 1250, in-vehicle calls 1260, and odor level 1270.

User ID 1210 is information that identifies a user. Reservation tendency analysis result 1220 is information that indicates a tendency for a level of dirt of a seat reserved by a user identified by a corresponding user ID 1210. Reservation tendency analysis result 1220 is expressed with six degrees level 1 to level 6 that indicate a higher level of dirt as the number is higher, similar to dirt level 1030, or is expressed as "undefined" which indicates that the tendency cannot be identified. Usage tendency analysis result 1230 is information that indicates a tendency for a change in dirt level at the time of boarding and alighting of the seat used by a user identified by the corresponding user ID 1210. Usage tendency analysis result 1230 is expressed with eleven degrees level −5 to level 5 that indicate a higher level of dirt as the number is higher, or is expressed as "undefined" which indicates that the tendency cannot be identified. Tolerance 1240 is information that indicates a tolerance of a user identified by the corresponding user ID 1210 toward the state of the internal space of the moving body. Tolerance 1240 is expressed with six degrees level 1 to level 6 that indicate a higher tolerance as the number is higher. Average temperature set in vehicle 1250 is information that indicates an average temperature set inside the moving body including the seats used by a user identified by the corresponding user ID 1210. In-vehicle calls 1260 is information that indicates whether there is tendency to make calls, e.g. with a cell phone, in the moving body including the seats used by a user identified by the corresponding user ID 1210. In-vehicle calls 1260 is expresses with either one of 1 when there is a tendency to make calls and 0 when there is no such tendency. Odor level 1270 is information that indicates a tendency for an odor level in the internal space of the moving body including the seats used by a user identified by the corresponding user ID 1210. Odor level 1270 is expressed with six degrees level 1 to level 6 that indicate a stronger odor as the number is higher.

Returning to FIG. 1, information presentation system 1 will be further described.

User manager 390 updates and manages user management database 391. User manager 390 may, for example, be realized by dedicated hardware. Control center terminal 30 includes, for example, a processor and memory, and may be realized by the processor executing a program stored in the memory.

Input interface 340 receives an input from the user that uses control center terminal 30. Input interface 340 includes, for example, a touchpad, and may receive an input through a touch operation by the user that uses control center terminal 30. Input interface 340 includes, for example, input keys, and may also receive an input through a key operation by the user that uses control center terminal 30. Input interface 340 includes, for example, a microphone, and may also receive an input through speech by the user that uses control center terminal 30.

Presenter 350 presents information to the user that uses control center terminal 30. Presenter 350 includes, for example, an LCD, and may present information by displaying an image to the user that uses control center terminal 30. Presenter 350 includes, for example, a speaker, and may present information by outputting speech to the user that uses control center terminal 30.

Communicator 320 communicates with other communicable devices. The other devices include user terminal 10 and moving body apparatus 20. Communicator 320 includes, for example, a wireless communicator, and may wirelessly communicate with the other devices.

User information analyzer 360 performs processes with regard to information about the user that uses information presentation system 1. More specifically, user information analyzer 360 performs a usage tendency analysis process during which a usage tendency of the moving body by the user is analyzed from a usage history of the moving body by the user, a reservation tendency analysis process during which a reservation tendency of the moving body by the user is analyzed from a reservation history of the moving body by the user, and a tolerance analysis process during which a user tolerance toward the internal space of the moving body is analyzed from the usage history of the moving body by the user. The reservation tendency analysis process, the usage tendency analysis process, and the tolerance analysis process will be described more in detail later with reference to the drawings. User information analyzer 360 may, for example, be realized by dedicated hardware. Control center terminal 30 includes, for example, a processor and memory, and may be realized by the processor executing a program stored in the memory.

Internal state analyzer 370 performs a process with regard to information about the state of the internal space of the moving body. More specifically, internal state analyzer 370 performs a moving body internal state analysis process during which the state of the internal space of the moving body is analyzed, and the seat restriction configuration process during which a usage restriction on the seats in the moving body is configured. The moving body internal state analysis process and the seat restriction configuration process will be described in more detail later with reference to the drawings. Internal state analyzer 370 may, for example, be realized by dedicated hardware. Control center terminal 30 includes, for example, a processor and memory, and may be realized by the processor executing a program stored in the memory.

Presentation information generator 380 performs a process during which presentation information to be presented on the presentation apparatus is generated. Presentation information generator 380 causes the presentation apparatus to present the generated presentation information. More specifically, presentation information generator 380 performs the presentation information generation process during which presentation information for a second user is generated using the first attribute information and the vacancy information, the presentation information indicating, in accordance with the attribute of the first user, at least one of a vacant moving body and vacant seats among the at least one moving body. The presentation information generation process will be described in more detail later with reference to the drawings. A specific example of the presentation information to be presented on the presentation apparatus will also be described in more detail later with reference to the drawings. The presentation apparatus may be, for example, user terminal 10 including presenter 120, and may also be control center terminal 30 including presenter 350. Presentation information generator 380 performs a matching process during which ridesharing users sharing the same moving body are matched using the attribute information. The matching process will be described in more detail later with reference to the drawings. Presentation information generator 380 may, for example, be realized by dedicated hardware. Control center terminal 30 includes, for example, a processor and memory, and may be realized by the processor executing a program stored in the memory.

Controller 300 controls reservation manager 310, communicator 320, moving body manager 330, input interface 340, presenter 350, user information analyzer 360, internal state analyzer 370, presentation information generator 380, and user manager 390. Controller 300 may, for example, be realized by dedicated hardware. Control center terminal 30 includes, for example, a processor and memory, and may be realized by the processor executing a program stored in the memory.

Hereinafter, processes performed by information presentation system 1 will be described.

2. Operation of Information Presentation System

Information presentation system 1 performs a moving body internal state obtainment process, a usage tendency obtainment process, a reservation tendency obtainment process, a first tolerance obtainment process, a second tolerance obtainment process, and a presentation process. Hereinafter, these processes will be described in order with reference to the drawings.

The moving body internal state obtainment process will first be described.

During the moving body internal state obtainment process, the state information is obtained from the moving body and the moving body information stored in moving body management database 331 is updated based on the obtained state information.

Figure 5:
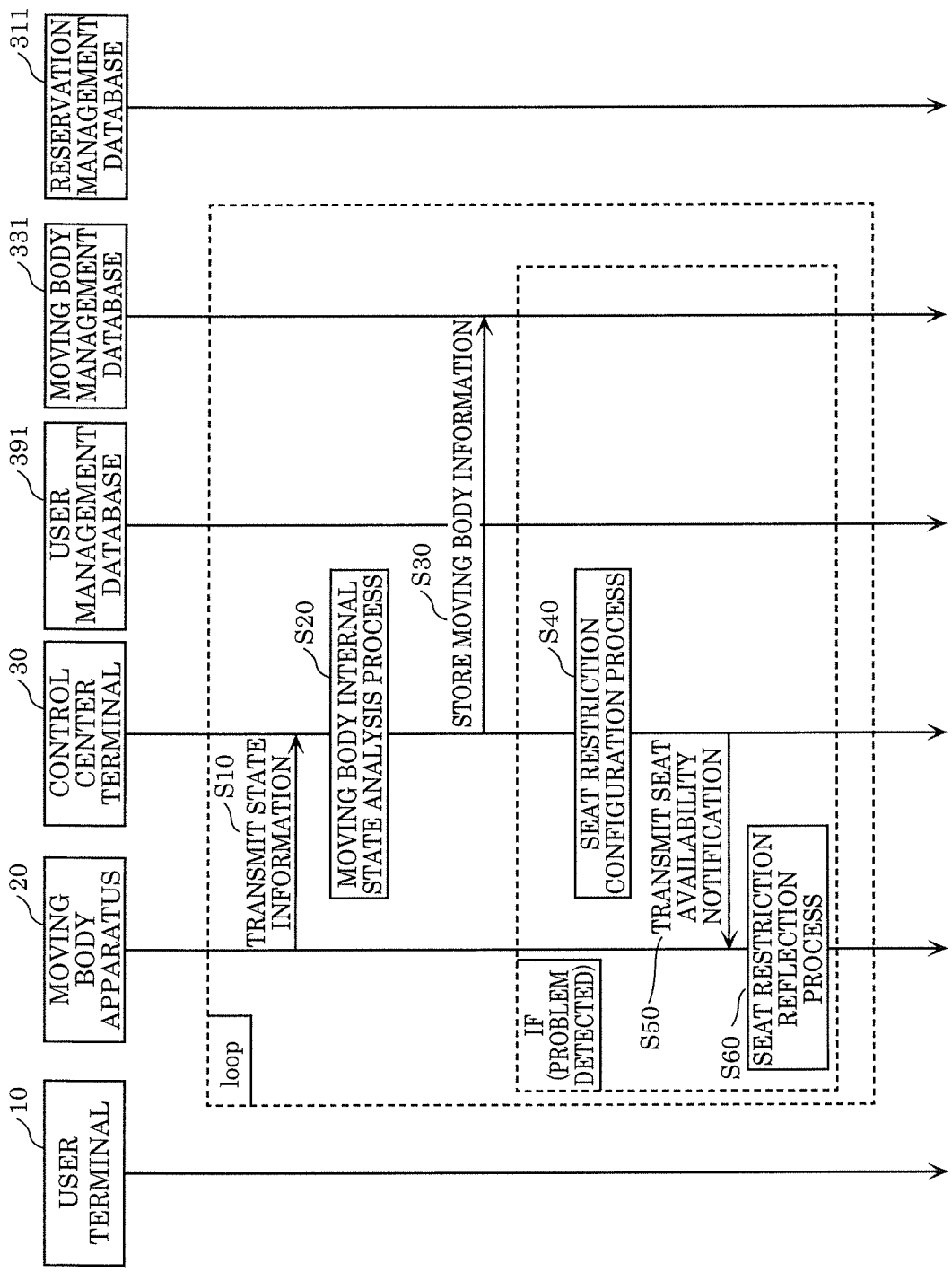
FIG. 5 is a sequence diagram of a moving body internal state obtainment process according to the embodiment.

FIG. 5 is a sequence diagram of the moving body internal state obtainment process.

The moving body internal state obtainment process is performed repeatedly as needed during operation of information presentation system 1. The moving body internal state obtainment process may be executed repeatedly for, for example, every predetermined period T1 (e.g. one minute).

Upon starting the moving body internal state obtainment process, each moving body apparatus 20 included in information presentation system 1 senses the internal space of the moving body in which moving body apparatus 20 is installed, and transmits the state information, which indicates the state of the internal space of the moving body and is detected from the sensing result, to control center terminal 30 (step S10). The state information may be, for example, a captured image of the seat in the moving body, information that indicates an odor sensed in the interior of the moving body, and a speech signal that is speech collected in the interior of the moving body and converted to an electrical signal. An example of the state information being a captured image of a seat in the moving body will be described. The image may be, for example, a visible light image captured with visible light, an infrared light image captured with infrared light, and a range image captured using visible light or infrared light.

Upon transmitting the state information from moving body apparatus 20, internal state analyzer 370 starts the moving body internal state analysis process (step S20).

Figure 6:
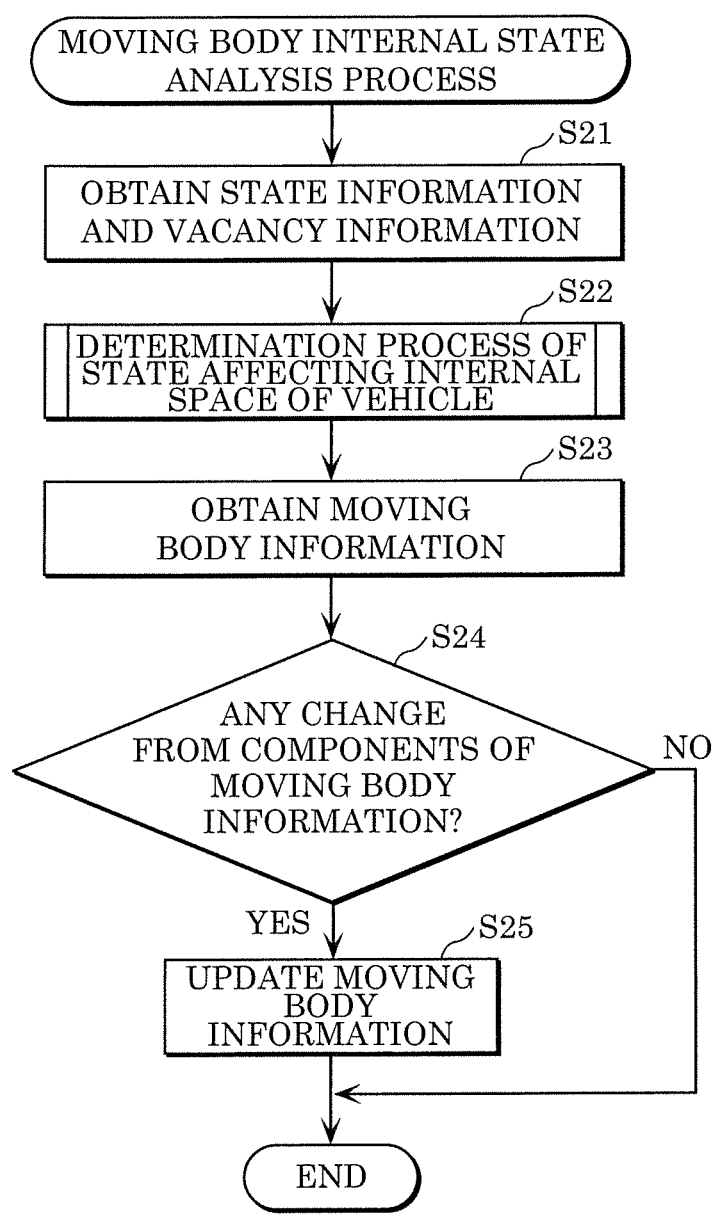
FIG. 6 is a flowchart of a moving body internal state analysis process according to the embodiment.

FIG. 6 is a flowchart of the moving body internal state analysis process.

Upon starting the moving body internal state analysis process, internal state analyzer 370 obtains the state information transmitted from moving body apparatus 20 and obtains the vacancy information stored in moving body management database 331 (step S21). Internal state analyzer 370 then stores the obtained state information in moving body management database 331.

Upon obtaining the state information and the vacancy information, internal state analyzer 370 starts a determination process of the state affecting the internal space of the vehicle (step S22).

Figure 7:
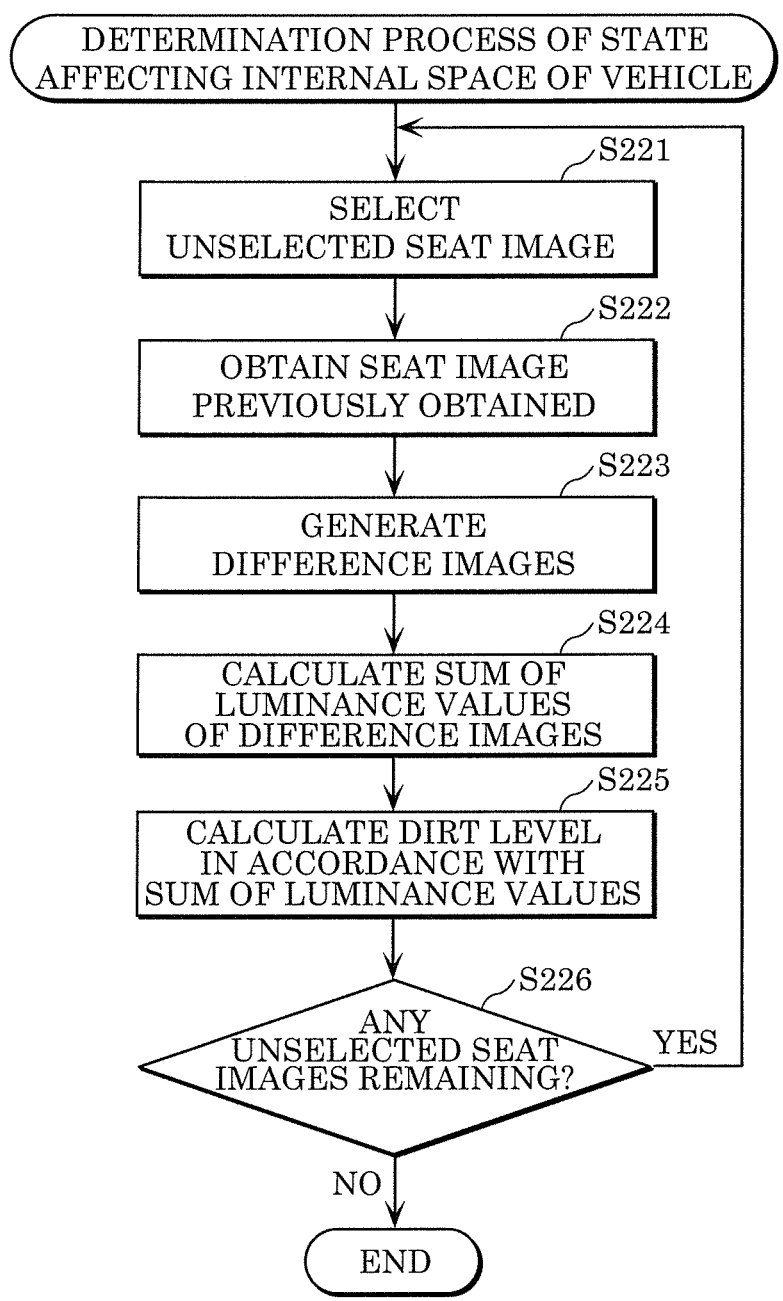
FIG. 7 is a flowchart of a determination process of a state affecting an internal space of a vehicle according to the embodiment.

FIG. 7 is a flowchart of the determination process of a state affecting an internal space of a vehicle.

Upon starting the determination process of the state affecting the internal space of the vehicle, internal state analyzer 370 identifies captured seat images of vacant seats and selects one unselected seat image from the identified seat images based on the obtained state information and vacancy information (step S221).

Upon selecting an unselected seat image, internal state analyzer 370 obtains a previously obtained seat image that is the same seat as the selected seat image (hereinafter referred to as "previous seat image") from moving body management database 331 (step S222).

Internal state analyzer 370 next generates difference images of the selected seat image and the obtained previous seat image (step S223), and calculates a sum of luminance values of the difference images (step S224). Internal state analyzer 370 then calculates a dirt level of the corresponding seat in accordance with the calculated sum (step S225). The dirt level is, for example, expressed with one of six degrees level 1 to level 6 that indicate a higher level of dirt as the number is higher in accordance with a predetermined standard.

Upon calculating the dirt level, internal state analyzer 370 checks whether there are any unselected seat images remaining among the seat images identified during the process of step S221 (step S226).

When there are unselected seat images remaining during the process of step S226 (step S226: YES), internal state analyzer 370 returns to the process of step S221 and performs the processes from step S221.

When there are no unselected seat images remaining during the process of step S226 (step S226: NO), internal state analyzer 370 ends the determination process of the state affecting the internal space of the vehicle.

Note that the contents of the process of step S224 and the process of step S225 may be changed in accordance with a sensor type used in the sensing of the internal space of the moving body by internal state obtainer 210.

Returning to FIG. 6, the moving body internal state analysis process will be further described.

Upon ending determination process of the state affecting the internal space of the vehicle (step S22), internal state analyzer 370 obtains the moving body information stored in moving body management database 331 (step S23).

Upon obtaining the moving body information, internal state analyzer 370 checks whether there is any change from components of the obtained moving body information in the dirt level calculated during the seat dirt degree determination process (step S24).

When the dirt level has changed from the components of the moving body information during the process of step S24 (step S24: YES), internal state analyzer 370 updates the moving body information in this dirt level (step S25).

When the dirt level has not changed from the components of the moving body information during the process of step S24 (step S24: NO), internal state analyzer 370 ends this moving body internal state analysis process.

Returning to FIG. 5, the moving body internal state obtainment process will be further described.

Upon ending the moving body internal state analysis process (step S20), control center terminal 30 stores the updated moving body information in moving body management database 331 (step S30). When the moving body information is not updated during the process of step S20, the process of step S30 is not performed.

When the moving body information is not updated and there is a seat in this moving body information that satisfies a predetermined condition that indicates a problem has been detected with the seat in the moving body (hereinafter also referred to as "problem seat"), internal state analyzer 370 starts the seat restriction configuration process (step S40). The predetermined condition that indicates a problem has been detected with the seat in the moving body may, for example, be that dirt level 1030 corresponding to seat 1020 is at least a predetermined level (e.g. level 5).

Figure 8:
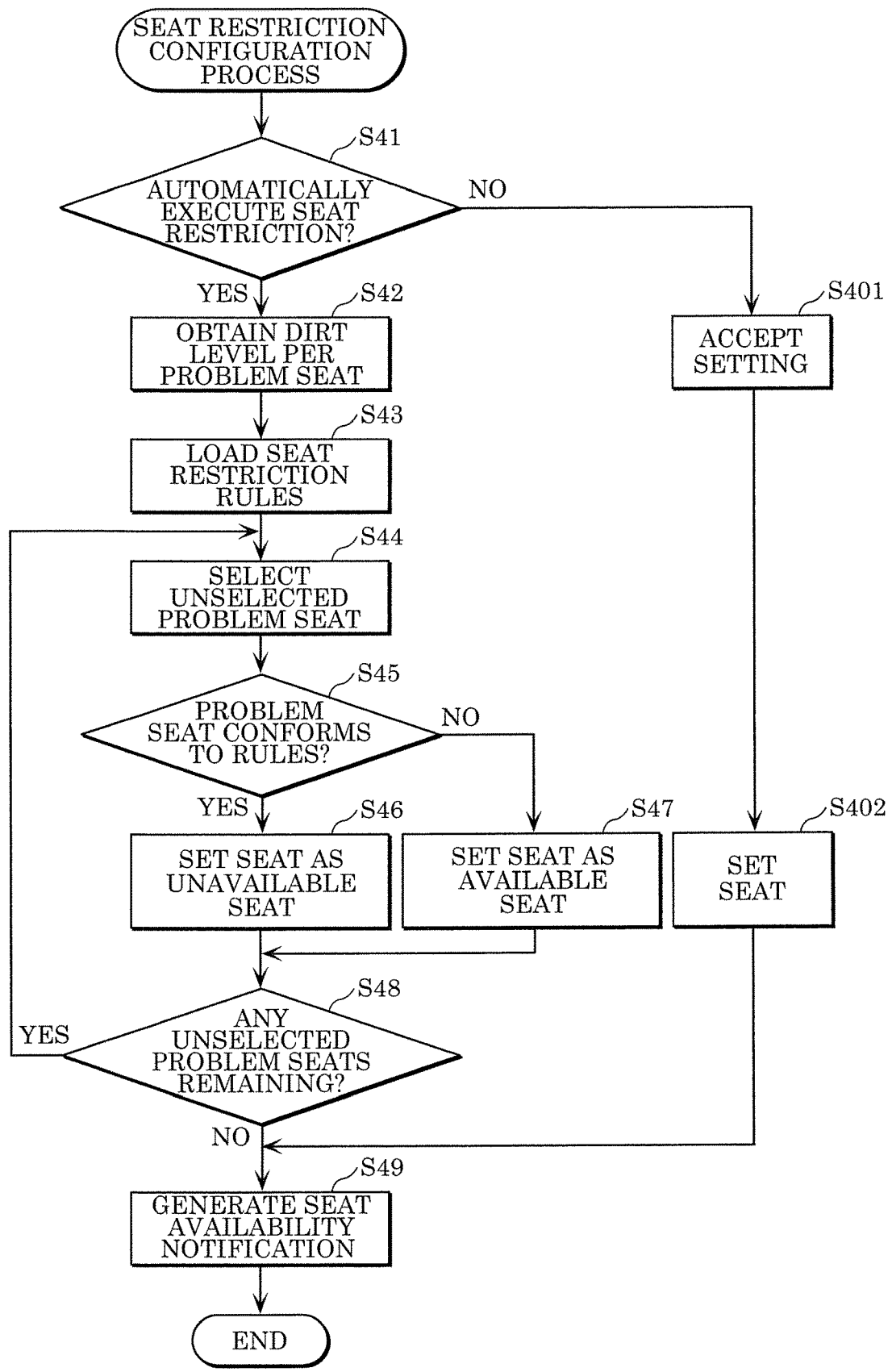
FIG. 8 is a flowchart of a seat restriction configuration process according to the embodiment.

FIG. 8 is a flowchart of the seat restriction configuration process.

Upon starting the seat restriction configuration process, internal state analyzer 370 checks whether the usage restriction on the seats is configured to be performed automatically (step S41).

When the usage restriction on the seats is configured to be performed automatically during the process of step S41 (step S41: YES), internal state analyzer 370 obtains dirt level 1030 per problem seat (step S42) and loads seat restriction rules that indicate rules for setting a usage restriction on the seats (step S43).

Upon loading the seat restriction rules, internal state analyzer 370 selects one unselected problem seat from the problem seats (step S44).

Upon selecting the unselected problem seat, internal state analyzer 370 checks whether dirt level 1030 of the seat conforms to the seat restriction rules (step S45).

When the seat conforms to the seat restriction rules during the process of step S45 (step S45: YES), internal state analyzer 370 sets the selected problem seat as unavailable seat restricted in usage (step S46).

When the seat does not conform to the seat restriction rules during the process of step S45 (step S45: NO), internal state analyzer 370 sets the selected problem seat as available seat not restricted in usage (step S47).

When the process of step S46 and the process of step S47 are ended, internal state analyzer 370 checks whether there are any unselected problem seats remaining among the problem seats (step S48).

When there are unselected problem seats remaining during the process of step S48 (step S48: YES), internal state analyzer 370 returns to the process of step S44 and performs the processes from step S44.

When the usage restriction on the seats is not configured to be performed automatically during the process of step S41 (step S41: NO), internal state analyzer 370 accepts, from a user using control center terminal 30, an input that indicates whether to set each problem seat to either one of unavailable seat and available seat (step S401), and sets each problem seat to either one of unavailable seat and available seat (step S402).

When there are no unselected problems seats remaining during the process of step S48 (step S48: NO) and the process of step S402 is ended, internal state analyzer 370 generates a seat availability notification that indicates whether each problem seat is set to either one of unavailable seat and available seat (step S49), and updates the moving body information stored in moving body management database 331 with the contents of the problem seats.

Upon ending the process of step S49, internal state analyzer 370 ends the seat restriction configuration process.

Returning to FIG. 5, the moving body internal state obtainment process will be further described.

Upon ending the seat restriction configuration process (step S40), control center terminal 30 transmits the seat availability notification to each moving body apparatus 20 installed in a moving body with the problem seat (step S50).

Upon transmitting the seat availability notification, each moving body apparatus 20 installed in the moving body with the problem seat starts the seat restriction reflection process (step S60).

Figure 9:
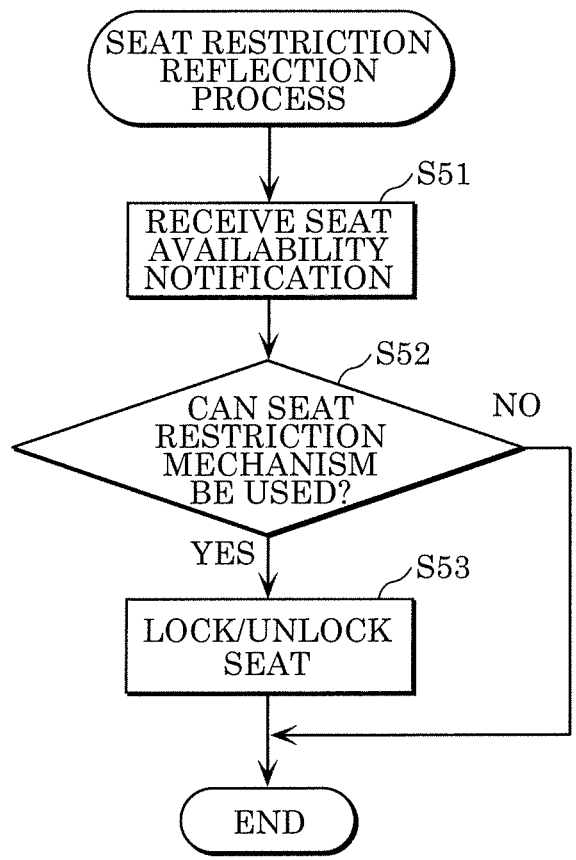
FIG. 9 is a flowchart of a seat restriction reflection process according to the embodiment.

FIG. 9 is a flowchart of the seat restriction reflection process.

Upon starting the seat restriction reflection process, seat restrictor 230 receives the seat availability notification transmitted from control center terminal 30 (step S51).

Upon receiving the seat availability notification, seat restrictor 230 checks whether a seat restriction mechanism (e.g. cover fitting apparatus) can be used that switches a target seat between the locked state and the unlocked state (step S52).

When the seat restriction mechanism can be used during the process of step S52 (step S52: YES), seat restrictor 230 sets the target seat, in accordance with the received seat availability notification, to the locked state when the seat availability notification indicates the target seat is set to unavailable seat, and to the unlocked state when the seat availability notification indicates the target seat is set to available seat (step S53).

When the process of step S53 is finished and the seat restriction mechanism cannot be used during the process of step S52 (step S52: NO), seat restrictor 230 ends the seat restriction reflection process.

Returning to FIG. 5, the moving body internal state obtainment process will be further described.

When the process of step S60 is ended, the moving body information is not updated during the process of step S30, there is no problem seat in this moving body information, and the moving body information is not updated during the process of step S20, information presentation system 1 ends the moving body internal state obtainment process.

The usage tendency obtainment process will be described next.

During the usage tendency obtainment process, when the user has used the moving body, the state information of the moving body before the user has boarded and after the user has alighted is obtained, and the attribute information stored in user management database 391 is updated based on the obtained state information.

Figure 10:
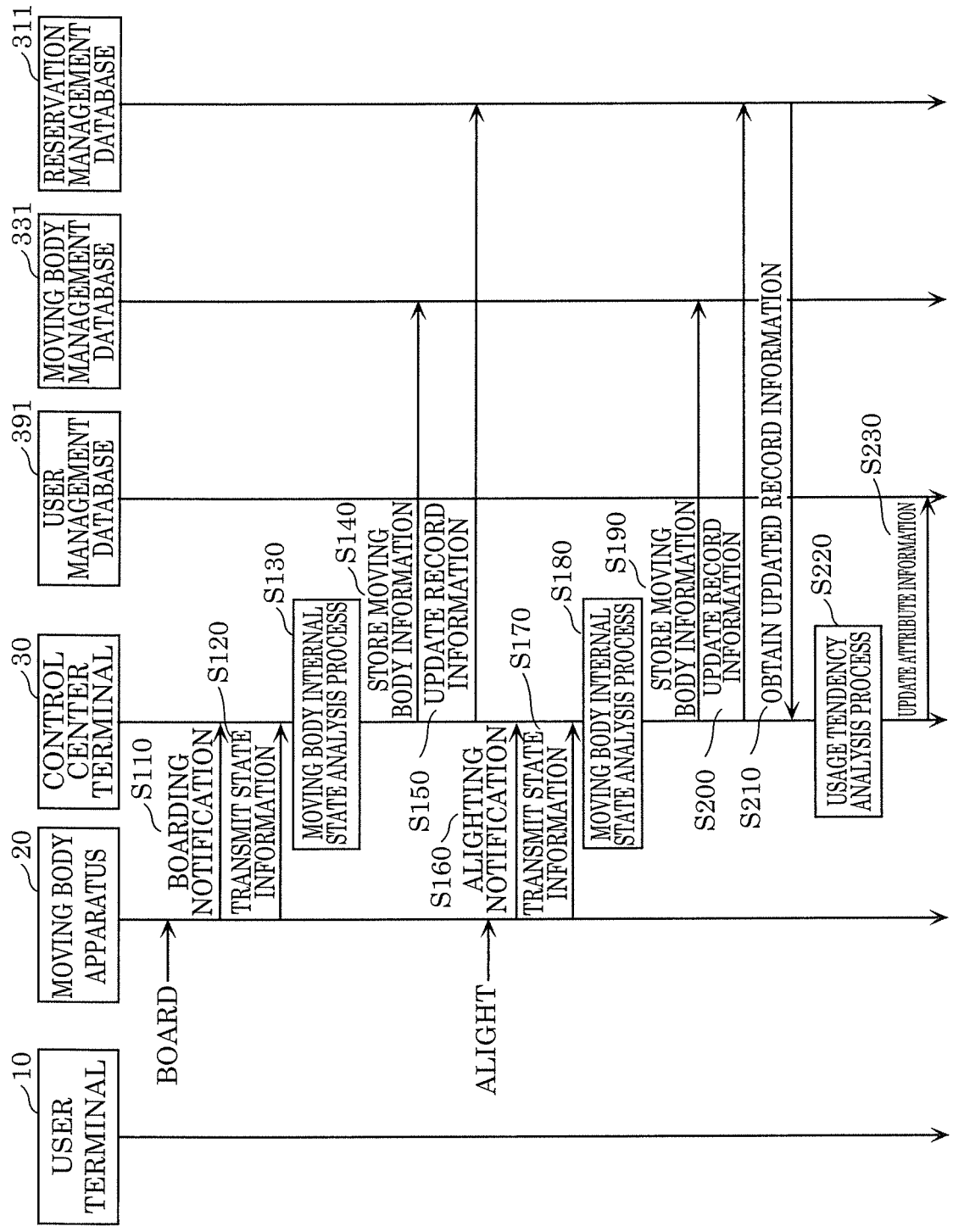
FIG. 10 is a sequence diagram of a usage tendency obtainment process according to the embodiment.

FIG. 10 is a sequence diagram of the usage tendency obtainment process.

The usage tendency obtainment process starts when the user boards the moving body.

Upon starting the usage tendency obtainment process, moving body apparatus 20, which is installed in the moving body that the user boards, transmits a boarding notification that the user has boarded the moving body to control center terminal 30 (step S110). Moving body apparatus 20 then transmits the state information about the seat that the user is going to use (an example will be described here in which the state information is an image captured of the seat) detected from the sensing result sensed immediately before the user boards the moving body to control center terminal 30 (step S120).

Upon transmitting the boarding notification and the state information from moving body apparatus 20, internal state analyzer 370 performs the moving body internal state analysis process (see FIG. 6) (step S130).

Upon ending the moving body internal state analysis process of step S130, internal state analyzer 370 stores the moving body information updated during the process of step S130 in moving body management database 331 (step S140). When the moving body information is not updated during the process of step S130, the process of step S140 is not performed.

Internal state analyzer 370 next updates the record information stored in reservation management database 311 by updating dirt level at time of boarding 1150 with the dirt level of the seat used by the user calculated during the moving body internal state analysis process of step S130 (step S150).

Subsequently, when the user alights from the moving body, moving body apparatus 20 installed in this moving body transmits an alighting notification that the user has alighting from the moving body to control center terminal 30 (step S160). Moving body apparatus 20 then transmits the state information about the seat that the user has used (the image captured of the seat) detected from the sensing result sensed immediately after the user has alighted from the moving body to control center terminal 30 (step S170).

Upon transmitting the alighting notification and the state information from moving body apparatus 20, internal state analyzer 370 performs the moving body internal state analysis process (see FIG. 6) (step S180).

Upon ending the moving body internal state analysis process of step S180, internal state analyzer 370 stores the moving body information updated during the process of step S180 in moving body management database 331 (step S190). When the moving body information is not updated during the process of step S180, the process of step S190 is not performed.

Internal state analyzer 370 next updates the record information stored in reservation management database 311 by updating dirt level at time of alighting 1160 with the dirt level of the seat used by the user calculated during the moving body internal state analysis process of step S180 (step S200). Internal state analyzer 370 updates the record information stored in reservation management database 311 based on the state information transmitted together with the alighting notification. More specifically, internal state analyzer 370 updates the record information stored in reservation management database 311 by updating temperature set in vehicle 1170 with the temperature set in the vehicle when the user has boarded, in-vehicle calls 1180 with the in-vehicle calls made when the user has boarded, and odor level 1190 with the odor level when the uses has boarded, based on the state information transmitted together with the alighting notification.

Upon updating the record information, user information analyzer 360 obtains the updated record information from reservation management database 311 (step S210).

Upon obtaining the updated record information, user information analyzer 360 starts the usage tendency analysis process (step S220).

The usage tendency analysis process includes a first usage tendency analysis process to an $L^{th}$ usage tendency analysis process corresponding to L (L is an integer of at least 2) components (here, usage tendency analysis result 1230, average temperature set in vehicle 1250, in-vehicle calls 1260, odor level 1270, etc.) excluding reservation tendency analysis result 1220 and tolerance 1240 from the components corresponding to user ID 1210 in the attribute information stored in user management database 391. The first usage tendency analysis process to the $L^{th}$ usage tendency analysis process are for calculating the above L components.

Upon starting the usage tendency analysis process, user information analyzer 360 executes the first usage tendency analysis process to the $L^{th}$ usage tendency analysis process in order.

The first usage tendency analysis process corresponding to reservation tendency analysis result 1220 and the second usage tendency analysis process corresponding to average temperature set in vehicle 1250 will be described here representing these L processes.

Figure 11A:
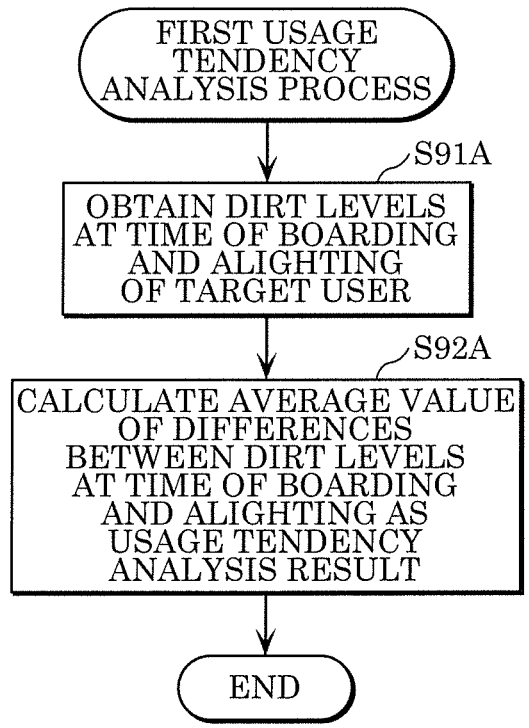
FIG. 11A is a flowchart of a first usage tendency analysis process according to the embodiment.

FIG. 11A is a flowchart of the first usage tendency analysis process.

Upon starting the first usage tendency analysis process, user information analyzer 360 obtains dirt level at time of boarding 1150 and dirt level at time of alighting 1160, which correspond to user ID 1120 identifying the user that boarded the moving body, from the obtained record information (step S91A).

User information analyzer 360 next calculates an average value of differences between the obtained dirt level at time of boarding 1150 and dirt level at time of alighting 1160, which correspond to the same reservation ID 1110, as a usage tendency analysis result (step S92A).

Upon ending the process of step S92A, user information analyzer 360 ends the first usage tendency analysis process.

Figure 11B:
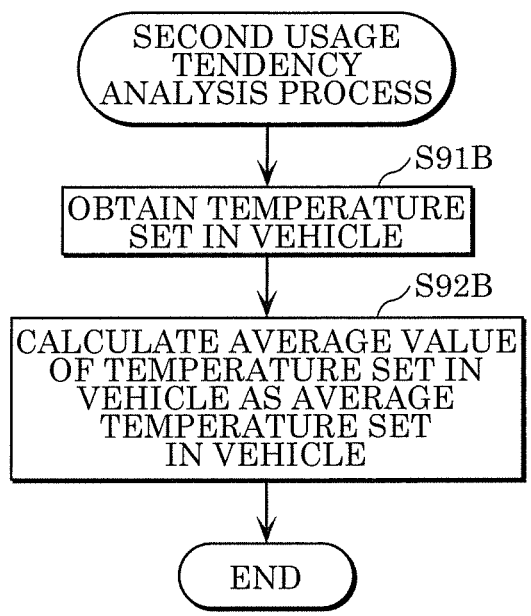
FIG. 11B is a flowchart of a second usage tendency analysis process according to the embodiment.

FIG. 11B is a flowchart of the second usage tendency analysis process.

Upon starting the second usage tendency analysis process, user information analyzer 360 obtains, from the obtained record information, temperature set in vehicle 1170 corresponding to user ID 1120 that identifies the user that has boarded the moving body (step S91B).

User information analyzer 360 next calculates an average value of the obtained temperature set in vehicle 1170 as an average temperature set in the vehicle (step S92B).

Upon ending the process of step S92B, user information analyzer 360 ends the second usage tendency analysis process.

Upon ending the first usage tendency analysis process to the $L^{th}$ usage tendency analysis process, user information analyzer 360 ends the usage tendency analysis process.

Returning to FIG. 10, the usage tendency analysis process will be described further.

Upon ending the usage tendency analysis process (step S220), user information analyzer 360 updates the attribute information stored in user management database 391 based on the calculation result calculated during the process of step S220 (step S230). In other words, user information analyzer 360 updates the attribute information stored in user management database 391 by, for example, updating usage tendency analysis result 1230 with the calculated usage tendency analysis result, and average temperature set in vehicle 1250 with the calculated average temperature set in the vehicle.

Upon ending the process of step S230, information presentation system 1 ends the usage tendency obtainment process. Note that the usage tendency analysis may be performed at an optional time.

The reservation tendency obtainment process will be described next.

During the reservation tendency obtainment process, the attribute information stored in user management database 391 is updated based on the record information stored in reservation management database 311.

Figure 12:
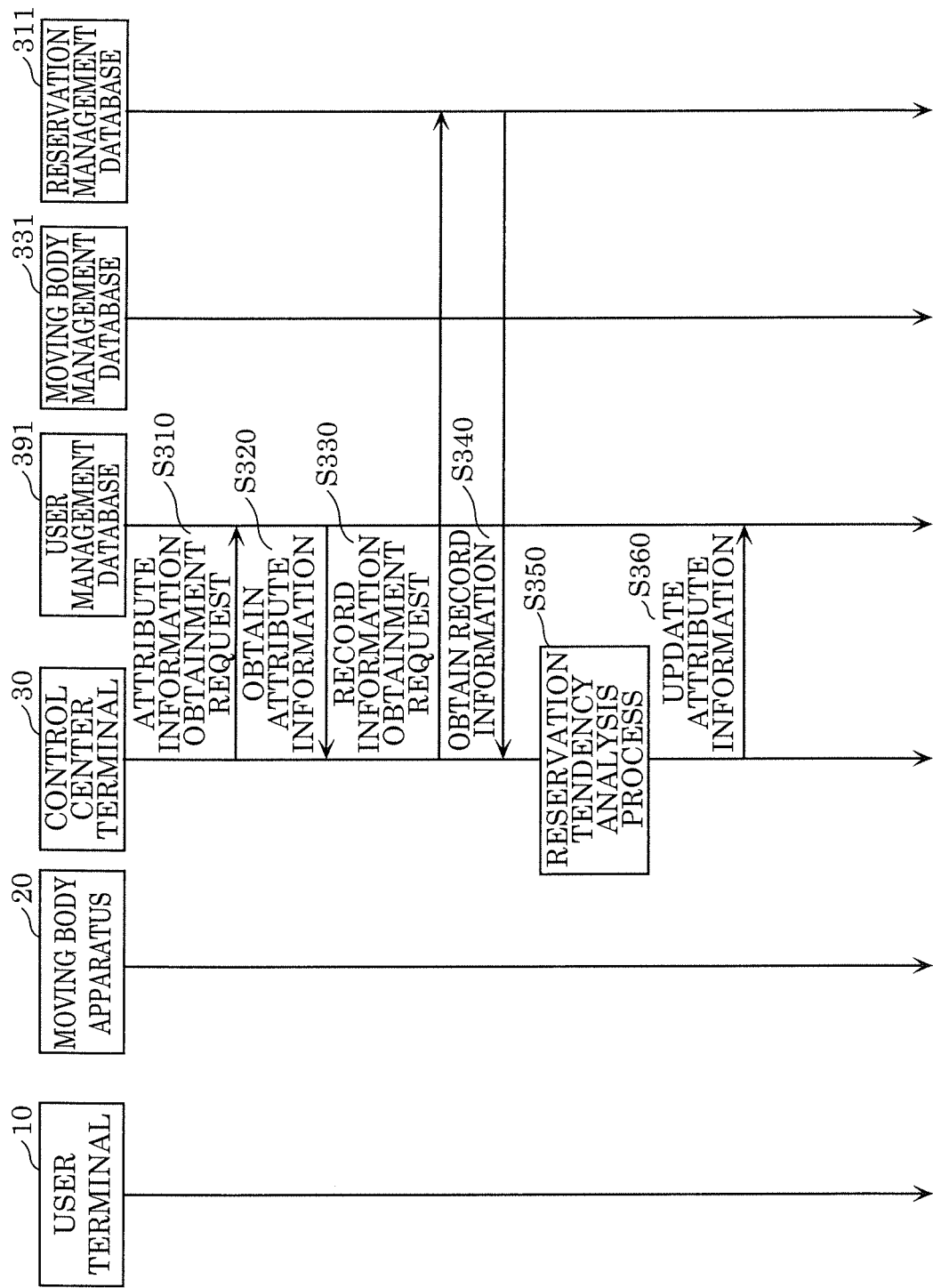
FIG. 12 is a sequence diagram of a reservation tendency obtainment process according to the embodiment.

FIG. 12 is a sequence diagram of the reservation tendency obtainment process.

The reservation tendency obtainment process is performed repeatedly as needed during the operation of information presentation system 1. The moving body internal state obtainment process may, for example, be executed repeatedly every day at a specific time after business hours of the servicer that provides the moving body (e.g. 3 a.m.).

Upon starting the reservation tendency obtainment process, user information analyzer 360 outputs an attribute information obtainment request to user management database 391 (step S310), and obtains the attribute information stored in user management database 391 (step S320). User information analyzer 360 outputs a record information obtainment request to reservation management database 311 (step S330), and obtains the record information stored in reservation management database 311 (step S340).

Upon obtaining the attribute information and the record information, user information analyzer 360 starts the reservation tendency analysis process (step S350).

Figure 13:
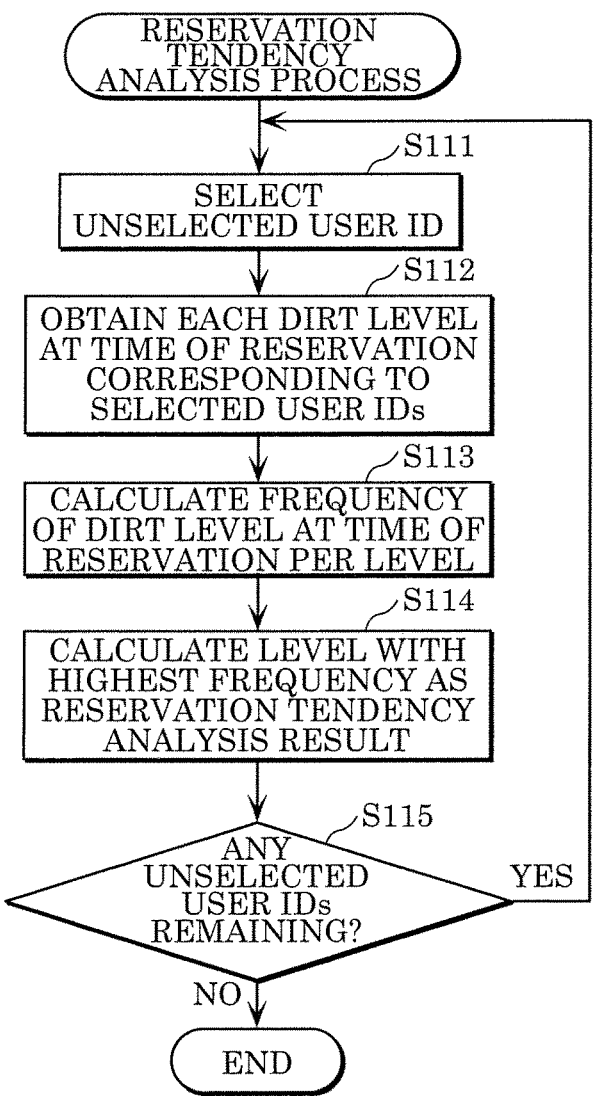
FIG. 13 is a flowchart of a reservation tendency analysis process according to the embodiment.

FIG. 13 is a flowchart of the reservation tendency analysis process.

Upon starting the reservation tendency analysis process, user information analyzer 360 selects an unselected user ID from user ID 1210 including the obtained attribute information (step S111).

Upon selecting the unselected user ID, user information analyzer 360 obtains each dirt level at time of reservation 1140 corresponding to selected user IDs in the obtained record information (step S112). The updating of dirt level at time of reservation 1140 in the record information will be described later when the presentation process is described.

Upon obtaining dirt level at time of reservation 1140, user information analyzer 360 calculates a frequency of dirt level at time of reservation 1140 per level (step S113), and calculates the level with the highest frequency as a reservation tendency analysis result (step S114).

Figure 14:
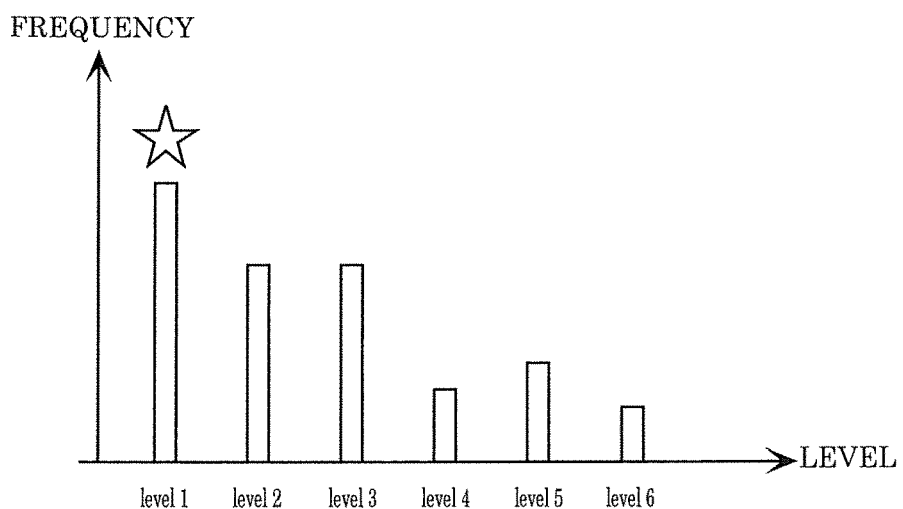
FIG. 14 is a schematic view showing an example of a level histogram according to the embodiment.

FIG. 14 is a schematic view showing an example of a level histogram according of dirt level at time of reservation 1140 obtained by user information analyzer 360.

In the example shown in FIG. 14, user information analyzer 360 has calculated level 1 with the highest frequency as the reservation tendency analysis result.

Note that during the process of step S114, user information analyzer 360 calculates the highest frequency level of each dirt level at time of reservation 1140 as the reservation tendency analysis result, but may also calculate the reservation tendency analysis result using another method as long as the reservation tendency analysis result is calculated based on dirt level at time of reservation 1140. User information analyzer 360 may, for example, calculate the average value of dirt level at time of reservation 1140 as the reservation tendency analysis result.

Returning to FIG. 13, the reservation tendency analysis process will be described further.

Upon calculating the reservation tendency analysis result, user information analyzer 360 checks whether there are any unselected user IDs remaining among user ID 1210 including the obtained attribute information (step S115).

When there are unselected user IDs remaining during the process of step S115 (step S115: YES), user information analyzer 360 returns to the process of step S111 and performs the processes from step S111.

When there are no unselected user IDs remaining during the process of step S115 (step S115: NO), user information analyzer 360 ends the reservation tendency analysis process.

Returning to FIG. 12, the reservation tendency analysis process will be described further.

Upon ending the reservation tendency analysis process (step S350), user information analyzer 360 updates the attribute information stored in user management database 391 by updating reservation tendency analysis result 1220 with the reservation tendency analysis result calculated during the process of step S350 (step S360).

Upon ending the process of step S360, information presentation system 1 ends the reservation tendency obtainment process.

The first tolerance obtainment process will be described next.

During the first tolerance obtainment process, a survey is conducted on the user, and the attribute information stored in user management database 391 is updated based on a result of this survey.

Figure 15:
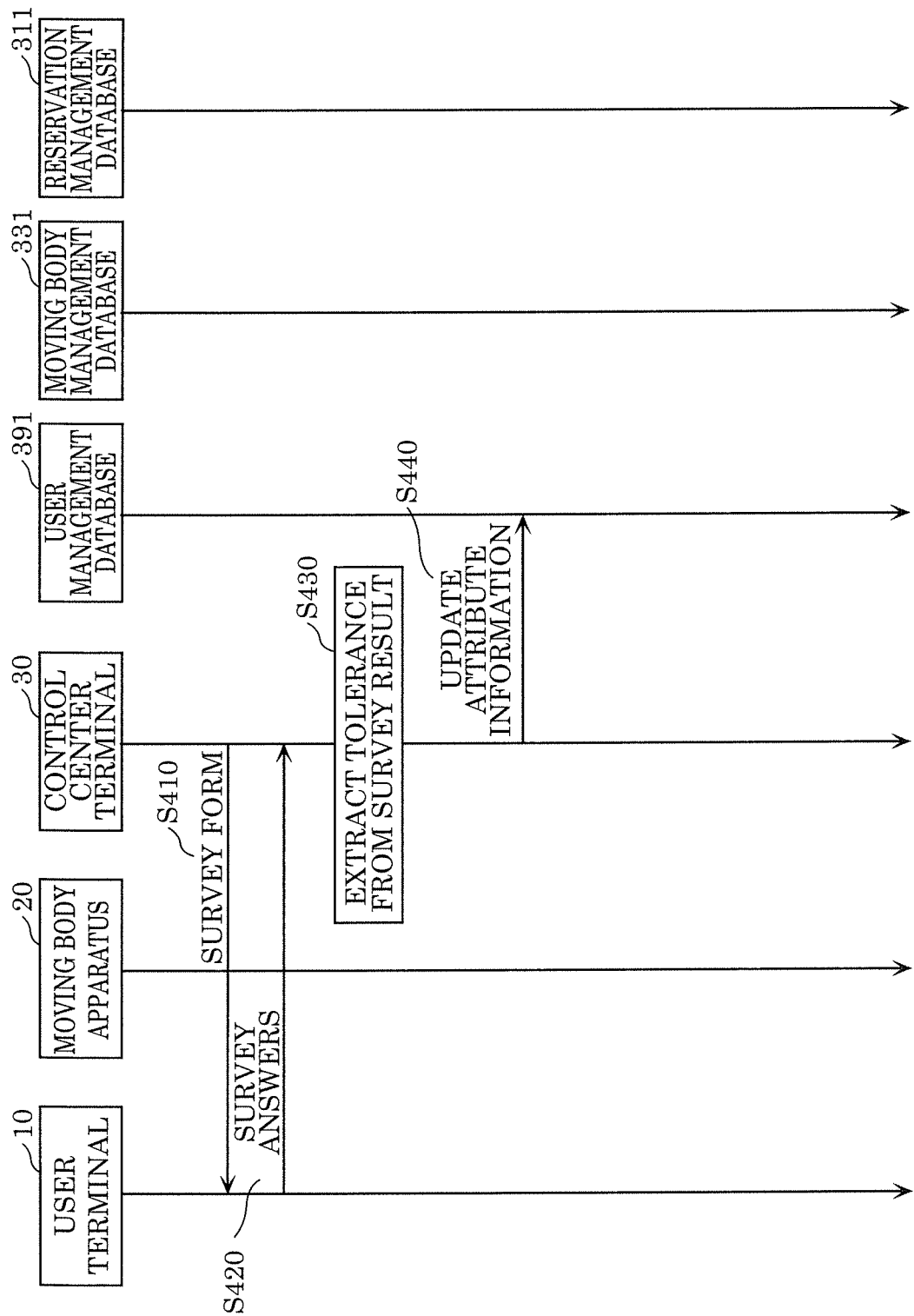
FIG. 15 is a sequence diagram of a first tolerance obtainment process according to the embodiment.

FIG. 15 is a sequence diagram of the first tolerance obtainment process.

The first tolerance obtainment process is performed repeatedly as needed during the operation of information presentation system 1. The first tolerance obtainment process may be conducted on the target user, for example, at a specified time after usage of the moving body (e.g. 6 p.m. on following day after usage) when the user has used the moving body.

Upon starting the first tolerance obtainment process, control center terminal 30 transmits, to user terminal 10 of the target user, a survey form including questions about the user tolerance toward the internal space of the moving body (step S410).

User terminal 10, having received the survey form, receives the answers of the user to this survey form, and transmits the received survey answers to control center terminal 30 (step S420).

Upon receiving the survey answers, control center terminal 30 extracts the user tolerance concerning the internal space of the moving body from the received survey answers (step S430), and updates the attribute information stored in user management database 391 by updating tolerance 1240 with the extracted tolerance (step S440).

The second tolerance obtainment process will be described next.

During the second tolerance obtainment process, the attribute information stored in user management database 391 is updated based on the record information stored in reservation management database 311. The second tolerance obtainment process is partially altered from the reservation tendency obtainment process.

Figure 16:
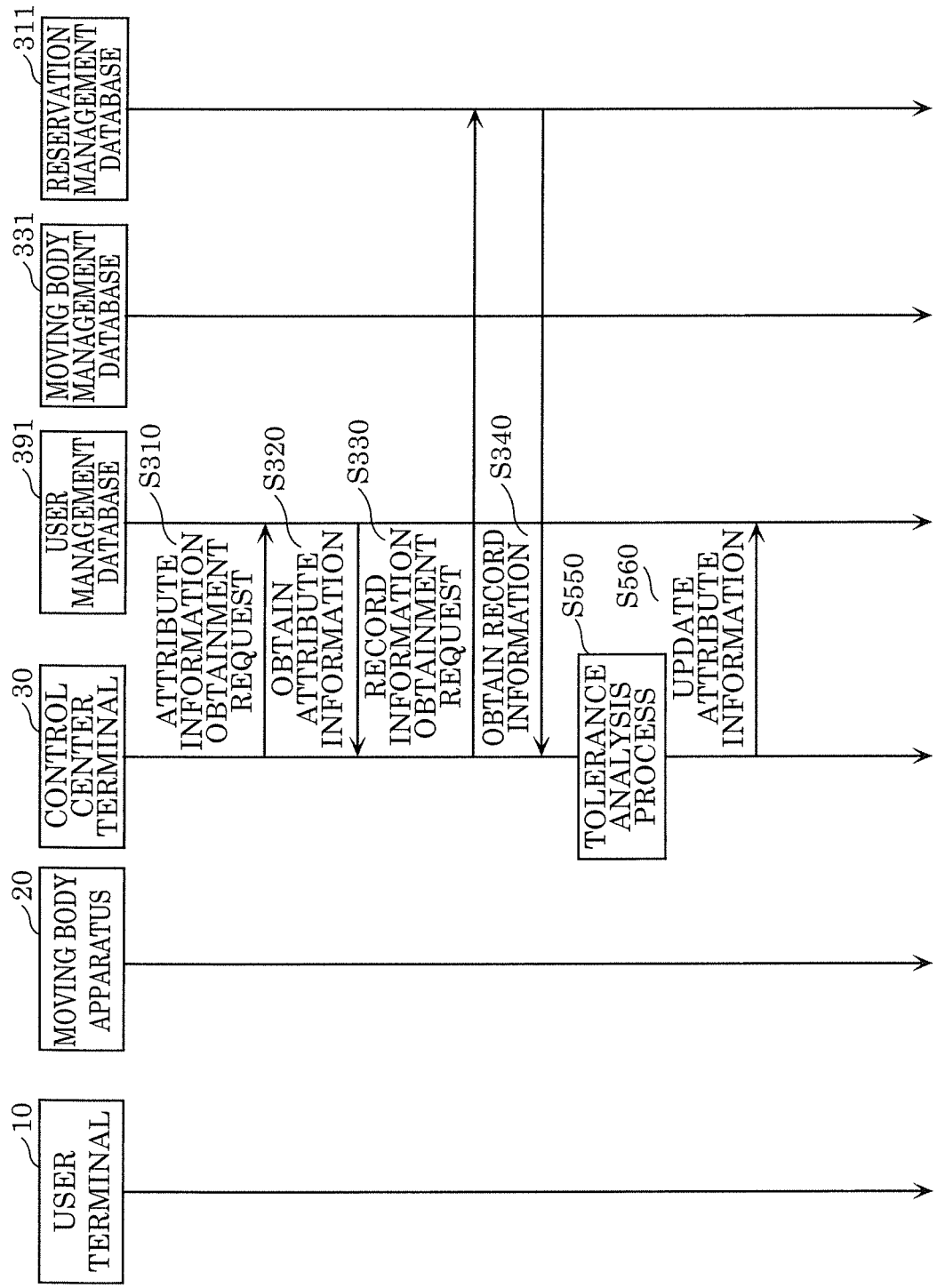
FIG. 16 is a sequence diagram of a second tolerance obtainment process according to the embodiment.

FIG. 16 is a sequence diagram of the second tolerance obtainment process.

As illustrated in FIG. 16, in the second tolerance obtainment process, the process of step S350 in the reservation tendency obtainment process (see FIG. 12) is changed to the process of step S550, and the process of step S360 in the reservation tendency obtainment process is changed to the process of step S560.

Accordingly, the differences with the reservation tendency obtainment process, the process of step S550 and the process of step S560, will mainly be described.

Upon ending the process of step S340, user information analyzer 360 starts the tolerance analysis process (step S550).

Figure 17:
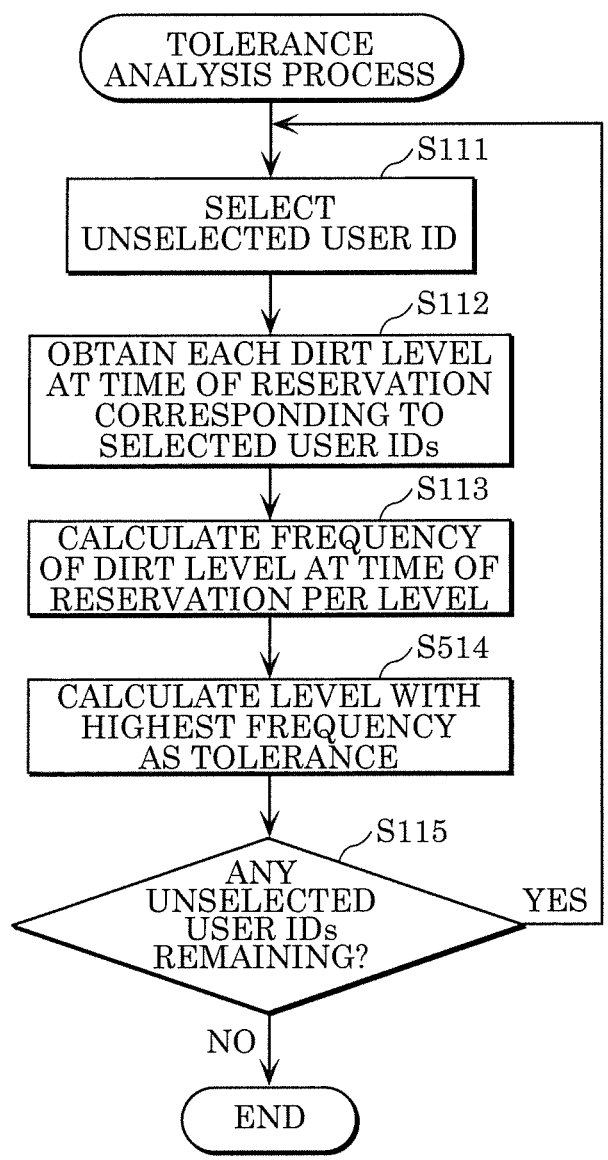
FIG. 17 is a flowchart of a tolerance analysis process according to the embodiment.

FIG. 17 is a flowchart of the tolerance analysis process.

As illustrated in FIG. 17, in the tolerance analysis process, the process of step S114 in the reservation tendency analysis process (see FIG. 13) is changed to the process of step S514.

Accordingly, the difference with the reservation tendency analysis process, the process of step S514, will mainly be described.

Upon ending the process of step S113, user information analyzer 360 calculates the level with the highest frequency as the user tolerance toward the internal space of the moving body (step S514).

Returning to FIG. 16, the second tolerance obtainment process will be further described.

Upon ending the process of step S550, user information analyzer 360 updates the attribute information stored in user management database 391 by updating tolerance 1240 with the calculated tolerance (step S560).

Upon ending the process of step S560, information presentation system 1 ends the second tolerance obtainment process.

The presentation process will be described next.

In the presentation process, when a user wishes to use the moving body, the user and possible ridesharing users that may share the moving body that the user will board are matched, presentation information for users is generated based on the matching result, and the generated presentation information is presented to the user.

Figure 18:
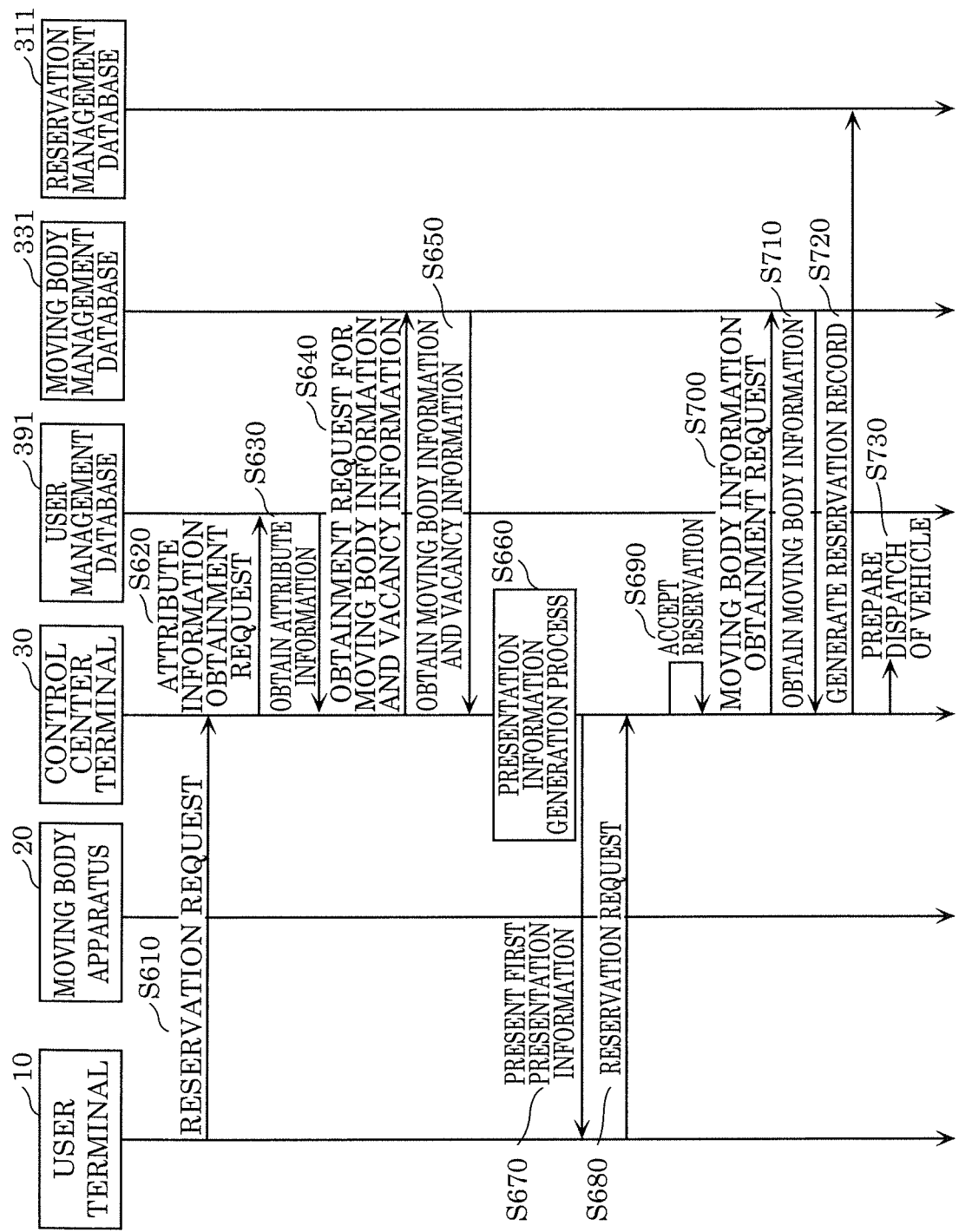
FIG. 18 is a sequence diagram of a presentation process according to the embodiment.

FIG. 18 is a sequence diagram of the presentation process.

The presentation process starts when user terminal 10 receives a reservation request from the user wishing to use the moving body and to make a reservation to use the moving body. User terminal 10 may, for example, accept a reservation request by causing presenter 120 to present reservation request input information that prompts the user to input a reservation request and accepting an input operation to input interface 110 in accordance with the reservation request input information.

Figure 19:
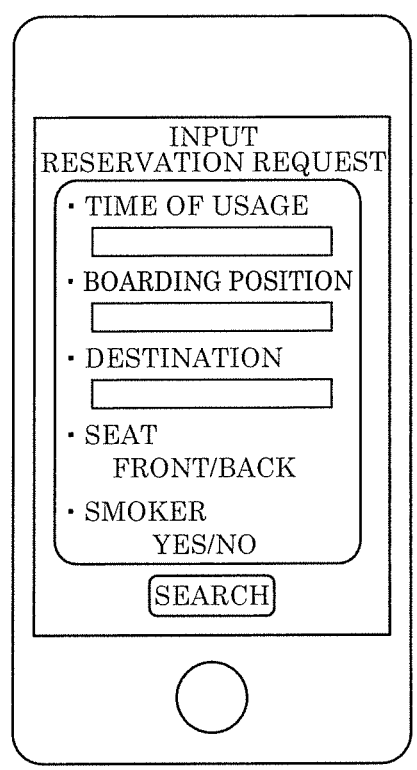
FIG. 19 is a schematic view showing an example of reservation request input information being presented according to the embodiment.

FIG. 19 is a schematic view showing an example of the reservation request input information being presented on presenter 120. As illustrated in FIG. 19, the reservation request input information may include information prompting input of a desired time of usage of the moving body, information prompting input of a desired boarding position, information prompting input of a desired location, information prompting input of a desired seat, and information prompting input of a desired internal environment of the moving body.

Returning to FIG. 18, the presentation process will be further described.

User terminal 10, having received the reservation request, transmits the received reservation request to control center terminal 30 (step S610).

Upon receiving the reservation request, presentation information generator 380 outputs an attribute information obtainment request to user management database 391 (step S620), and obtains the attribute information stored in user management database 391 (step S630). Presentation information generator 380 outputs an obtainment request for the moving body information and the vacancy information to moving body management database 331 (step S640), and obtains the moving body information and the vacancy information stored in moving body management database 331 (step S650).

Upon obtaining the attribute information, the moving body information, and the vacancy information, presentation information generator 380 starts the presentation information generation process (step S660).

Figure 20:
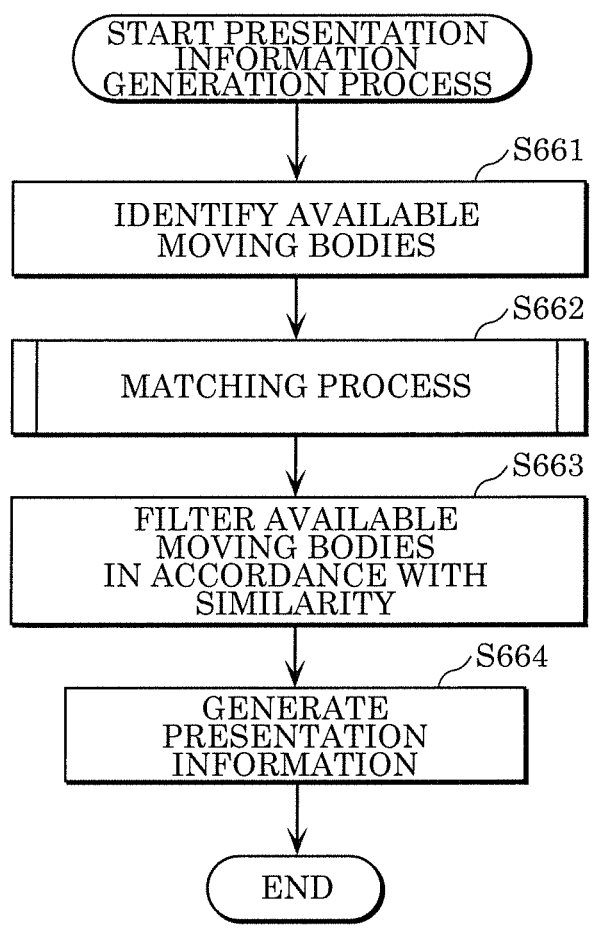
FIG. 20 is a flowchart of a presentation information generation process according to the embodiment.

FIG. 20 is a flowchart of the presentation information generation process.

Upon starting the presentation information generation process, presentation information generator 380 identifies moving bodies that the user wishing to use the moving body can use (hereinafter also referred to as "available moving bodies") based on the obtained vacancy information (step S661).

Upon identifying the available moving bodies, presentation information generator 380 starts the matching process (step S662).

Figure 21:
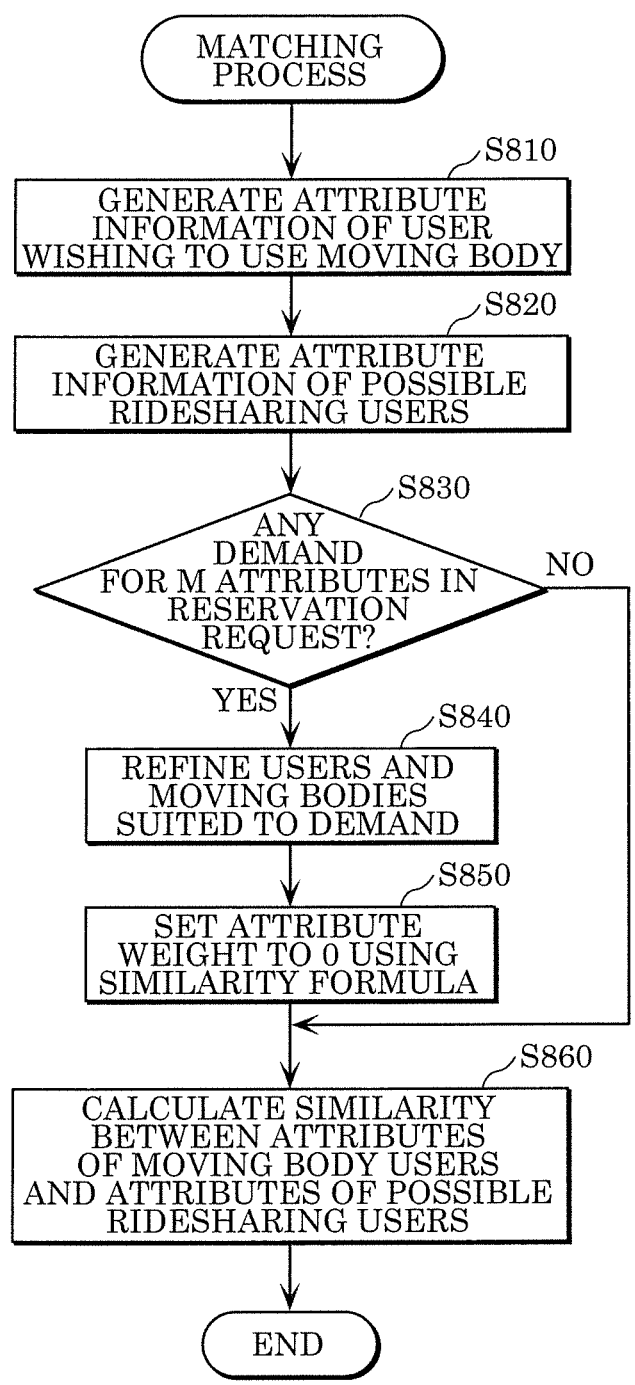
FIG. 21 is a flowchart of a matching process according to the embodiment.

FIG. 21 is a flowchart of the matching process.

Upon starting the matching process, presentation information generator 380, based on the accepted reservation request and the obtained attribute information, calculates M (M is an integer of at least 2) digitized attributes of the user wishing to use the moving body, and generates attribute information of the user wishing to use the moving body including the calculated M digitized attributes.

FIG. 22 is a data structure diagram showing an example of the attribute information of the user wishing to use the moving body.

As illustrated in FIG. 21, the attribute information of the user wishing to use the moving body corresponds to a user ID that identifies the user wishing to use the moving body and M attributes.

FIG. 23 is a specific example of the attribute information of the user wishing to use the moving body.

As illustrated in FIG. 23, the digitized attributes may be, for example, information that indicates whether the user is a smoker with 0 or 1, information that indicates whether the user keeps the window open with 0 or 1, information that indicates whether the user uses the front seat or the back seat with 0 or 1, and information that indicates how easily the user makes the inside of the moving body dirty with 5 degrees.

Returning to FIG. 22, the matching process will be further described.

Upon generating the attribute information of the user wishing to use the moving body, presentation information generator 380, based on the obtained attribute information, calculates the M digitized attributes of possible ridesharing users, and generates attribute information of possible ridesharing users including the calculated M digitized attributes. The generated M digitized attributes are each the same as the M digitized attributes included in the attribute information of the user wishing to use the moving body.

FIG. 24 is a data structure diagram showing an example of the attribute information of possible ridesharing users.

As illustrated in FIG. 24, the attribute information of possible ridesharing users correspond to the user ID that identifies possible ridesharing users, a vehicle ID that identifies a vehicle reserved by the possible ridesharing users, and the M digitized attributes.

Returning to FIG. 21, the matching process will be further described.

Upon generating the attribute information of possible ridesharing users, presentation information generator 380 checks whether there is any demand for the M attributes in the accepted reservation request (step S830).

When there is demand for the M attributes during the process of step S830 (step S830: YES), presentation information generator 380 refines the possible ridesharing users and the available moving bodies (step S840). In other words, presentation information generator 380 excludes possible ridesharing users and available moving bodies that do not satisfy the demand.

Upon refining the possible ridesharing users and the available moving bodies, presentation information generator 380 sets attribute weight W[j] corresponding to the demand to 0 using a similarity formula described later (step S850).

When the process of step S850 is ended and there is no demand for the M attributes during the process of step S830 (step S830: NO), presentation information generator 380 calculates a similarity between an attribute of a user wishing to use the moving body (user$_A$) and an attribute of a possible ridesharing user (user) using the similarity formula expressed with Expression 1 (step S860). Possible ridesharing users with higher similarity are then calculated as possible ridesharing users with a higher matching rate based on the calculated similarity.

[Math 1]

$$\frac{\sum_{j=1}^{M} \{W[j] \times f_j(user_A[j], user_i[j])\}}{\sum_{j=1}^{M} W[j]}, (1 \leq i \leq N) \quad \text{Expression 1}$$

i is a possible ridesharing user ID, j is a possible ridesharing user attribute ID, N is a total number of possible ridesharing users, and M is a total number of possible ridesharing user attributes. $f_j$ (x1, x2) is an evaluation formula per possible ridesharing user attribute, and W[j] is a weight per possible ridesharing user attribute.

The evaluation method of $f_j$ ($x_1$, $x_2$) is predicted to change per attribute. For example, the attribute is evaluated on accordance in the case of preferred brightness, the attribute is evaluated on discordance in the case of seat position, and the degree is evaluated on closeness in the case of how easy the user makes the moving body dirty.

FIG. 25 is a correspondence table showing an example of a correspondence relationship between attributes, evaluation formulas, and weights.

As illustrated in FIG. 25, the evaluation formula and the weight are configured per attribute.

Returning to FIG. 21, the matching process will be further described.

Upon ending the process of step S860, presentation information generator 380 ends the matching process.

Returning to FIG. 20, the presentation information generation process will be further described.

Upon ending the matching process (step S662), presentation information generator 380 filters the available moving bodies in accordance with the calculated similarity in the process of step S662 (step S663), and generates the presentation information for the user wishing to use the moving body that indicates, in accordance with the possible ridesharing user attribute, the at least one of vacant moving body and the seats in the moving body (step S664). Upon generating the presentation information, presentation information generator 380 ends the presentation information generation process.

During the process of step S664, presentation information generator 380 may, for example, generate the presentation information in accordance with a relationship between the possible ridesharing user attribute and the attribute of the user wishing to use the moving body. Presentation information generator 380 may, for example, generate the presentation information in accordance with the degree of the relationship between the possible ridesharing user attribute and the attribute of the user wishing to use the moving body. Presentation information generator 380 may, for example, generate the presentation information with a moving body reserved by the possible ridesharing user as subject, the relationship between the possible ridesharing user attribute and the attribute of the user wishing to use the moving body fulfilling a predetermined condition. Presentation information generator 380 may, for example, generate the presentation information including the possible ridesharing user attribute. Presentation information generator 380 may, for example, generate the presentation information with a moving body other than a moving body reserved by the possible ridesharing user as subject when the attribute of the user wishing to use the moving body is the attribute of behavior that changes the state of the internal space of the moving body to a state that the possible ridesharing user has a low tolerance toward. Presentation information generator 380 may, for example, generate the presentation information with a moving body other than a moving body reserved by the possible ridesharing user as subject when the possible ridesharing user attribute is the attribute of behavior that changes the state of the internal space of the moving body to a state that the user wishing to use the moving body has a low tolerance toward. Presentation information generator 380 may, for example, generate the presentation information with a moving body as subject in which the state of the internal space of the moving body corresponds to at least one of the possible ridesharing user attribute and the attribute of the user wishing to use the moving body.

FIG. 26A, FIG. 26B, FIG. 26C, and FIG. 26D are schematic views showing an example of the presentation information generated by presentation information generator 380 being presented by presenter 120. In the examples shown in FIG. 26A, FIG. 26B, FIG. 26C, and FIG. 26D, the presentation information, which is generated based on the reservation input information input in accordance with the presentation of the reservation request input information shown in FIG. 19, is shown.

Figure 26A:
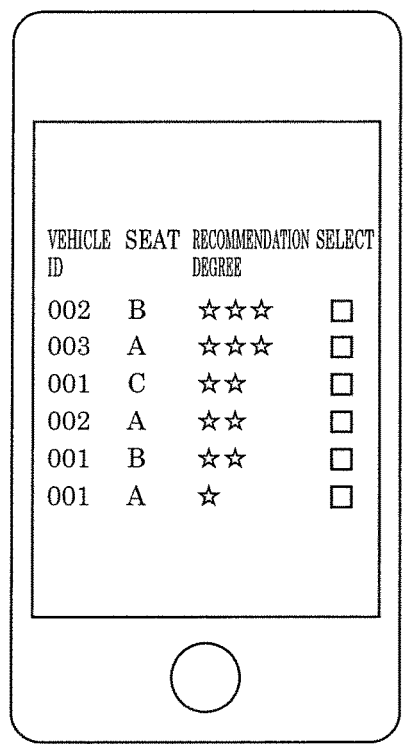
FIG. 26A is a schematic view showing an example of presentation information being presented according to the embodiment.

FIG. 26A is an example of the presentation information in which the similarity calculated during the matching process is presented as evaluation values, e.g. recommendation degree. As illustrated in FIG. 26A, presentation information generator 380 may, for example, not only present the possible ridesharing users themselves, but also generate presentation information in which moving bodies reserved by the possible ridesharing users are presented. Presentation information generator 380 may also, for example, generate presentation information in which the presentation target is presented in a list sorted by evaluation value, e.g. recommendation degree.

Figure 26B:
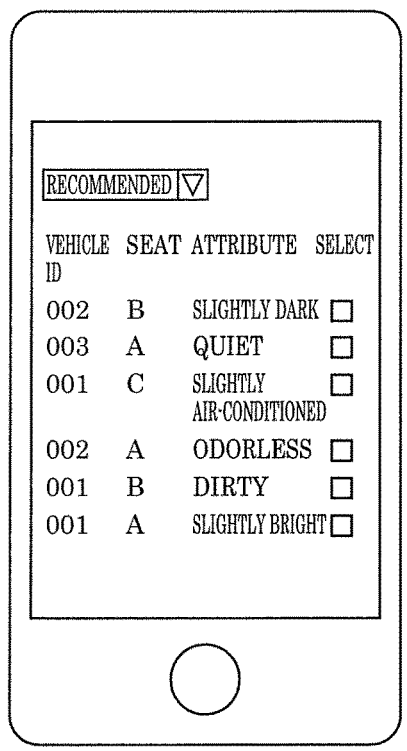
FIG. 26B is a schematic view showing an example of the presentation information being presented according to the embodiment.

FIG. 26B is an example of the presentation information in which the possible ridesharing user attributes are presented concerning the internal space of the moving body. In the example shown in FIG. 26B, the attributes are displayed with letters, but may also, for example, be displayed with intuitively straightforward pictograms. Instead of the possible ridesharing user attributes, state information that indicates the state of the internal state of the moving body may also be presented.

Figure 26C:
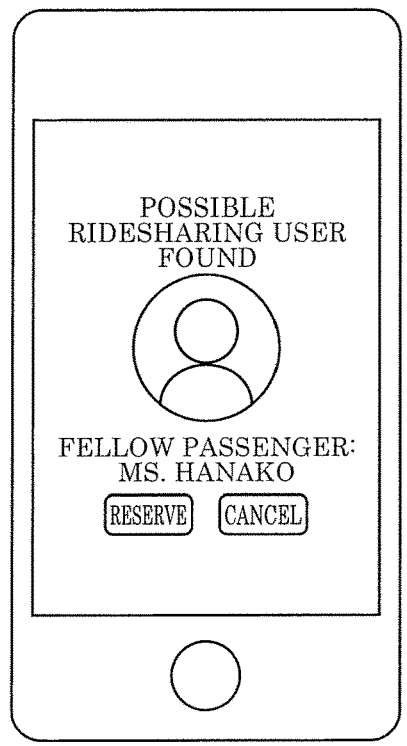
FIG. 26C is a schematic view showing an example of the presentation information being presented according to the embodiment.

FIG. 26C is an example of presentation information in which a possible ridesharing user with the highest similarity calculated during the matching process is presented. As illustrated in FIG. 26C, presentation information generator 380 may, for example, generate presentation information in which a picture of the possible ridesharing user is presented.

Figure 26D:
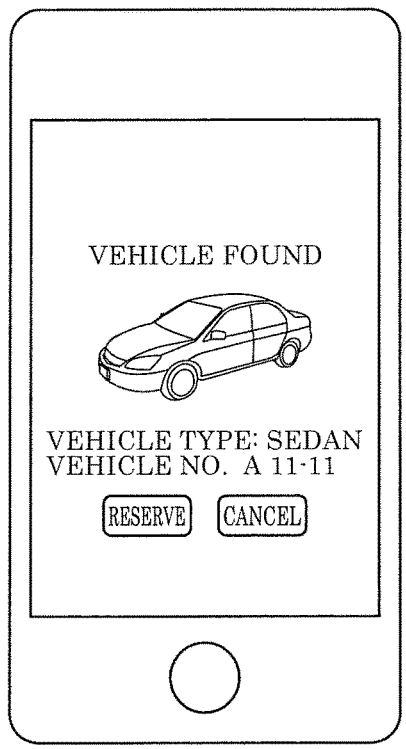
FIG. 26D is a schematic view showing an example of the presentation information being presented according to the embodiment.

FIG. 26D is an example of presentation information in which a moving body reserved by a possible ridesharing user with the highest similarity calculated during the matching process is presented. As illustrated in FIG. 26D, presentation information generator 380 may, for example, generate presentation information in which a picture of the moving body is presented.

Returning to FIG. 18, the presentation information generation process will be further described.

Upon ending the process of step S660, presentation information generator 380 transmits the presentation information to user terminal 10 of the user wishing to use the moving body, and causes presenter 120 to present the presentation information (step S670).

Upon presenting the presentation information on presenter 120, the user wishing to use the moving body determines which moving body or seat in the moving body to reserve while considering the possible ridesharing user attribute by checking the contents of the presentation information presented on presenter 120.

Upon receiving a reservation request that indicates the contents of the reservation to use moving body in accordance with the presentation information from the user wishing to use the moving body, user terminal 10, having presented the presentation information, transmits the reservation request to control center terminal 30 (step S680).

Upon receiving the reservation request, control center terminal 30 accepts the received reservation request to use the moving body (step S690).

Upon accepting the reservation to use the moving body, presentation information generator 380 outputs a moving body information obtainment request to moving body management database 331 (step S700), and obtains the moving body information stored in moving body management database 331 (step S710).

Upon obtaining the moving body information, presentation information generator 380 updates the record information corresponding to seat 1020 in the target moving body and stored in reservation management database 311 by updating dirt level at time of reservation 1140 with dirt level 1030 (step S720).

Upon updating the record information, control center terminal 30 prepares dispatch of the reserved moving body (step S730).

Upon ending the process of step S730, information presentation system 1 ends the presentation process.

3. Consideration

As described above, with information presentation system 1, when the user wishing to use the moving body inputs a reservation request for using the moving body to user terminal 10, the presentation information for the user wishing to use the moving body that indicates, in accordance with the possible ridesharing user attribute, the at least one of the vacant moving body or the vacant seats is presented on user terminal 10. Accordingly, the user wishing to use the moving body can determine which moving body or seat in the moving body to reserve while considering the possible ridesharing user attribute.

In this manner, information presentation system 1 makes it possible to achieve more suitable matches than before.

Other Embodiments

An information presentation system according to one or more aspects of the present disclosure has been described above based on the embodiment, but the present disclosure is not limited to the foregoing. Forms obtained by various combinations of the components in the different embodiments that can be conceived by a person skilled in the art which are within the scope of the essence of the present disclosure may also be included in the scope of the one or more aspects of the present disclosure.

1) In the embodiment, information presentation system 1 has been described as including user terminal 10, moving body apparatus 20, and control center terminal 30. However, the functionality realized by control center terminal 30 does not necessarily need to be realized by one apparatus and may also be realized by a plurality of mutually communicable apparatuses.

Figure 27:
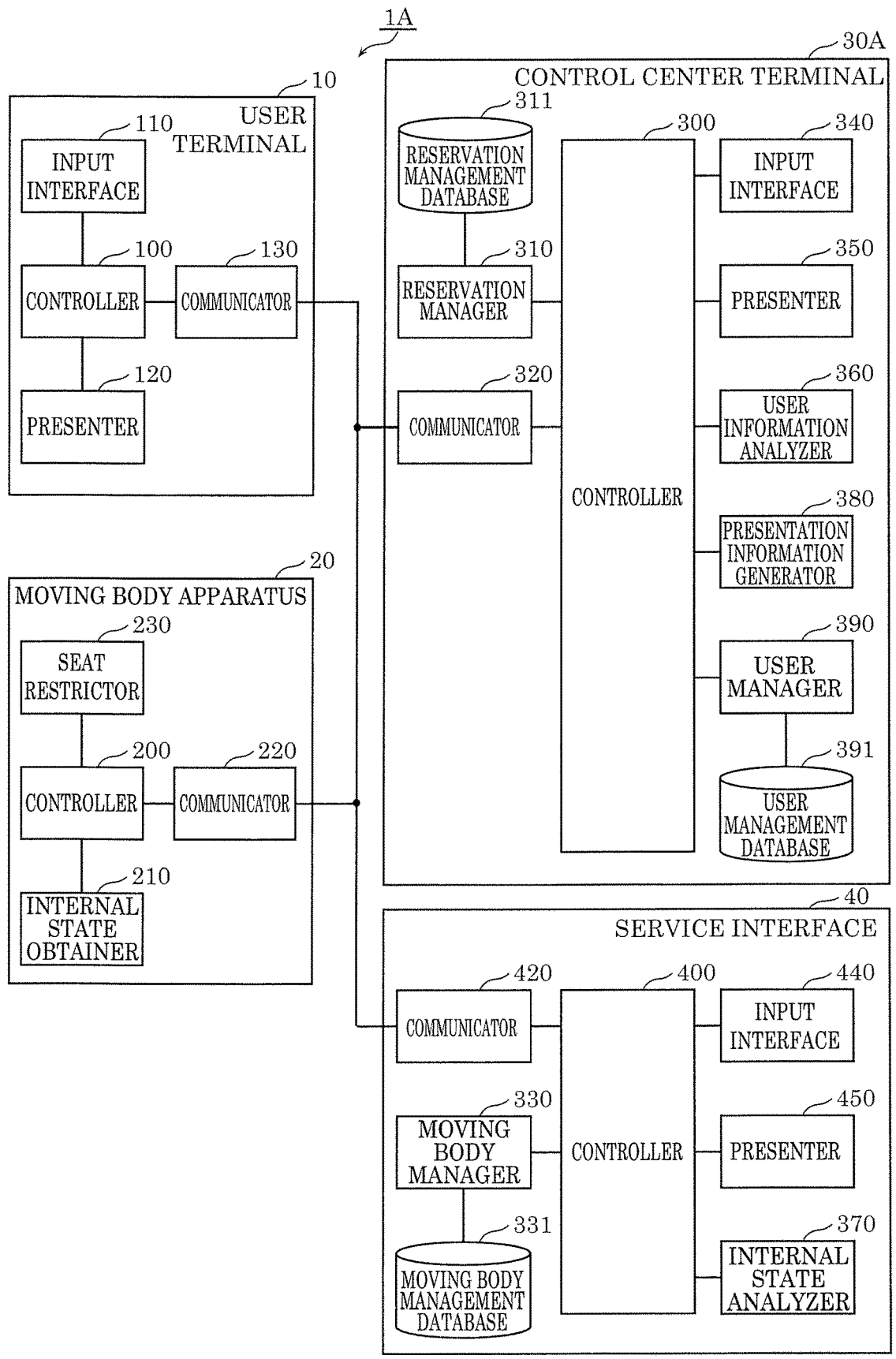
FIG. 27 is a block diagram showing a configuration of an information presentation system according to another embodiment.

FIG. 27 is a block diagram showing a configuration of information presentation system 1A according to another embodiment.

As illustrated in FIG. 27, information presentation system 1A includes, in addition to user terminal 10 according to the embodiment and moving body apparatus 20 according to the embodiment, control center terminal 30A partially changed from control center terminal 30 according to the embodiment, and servicer terminal 40.

Control center terminal 30A differs from control center terminal 30 according to the embodiment in that moving body manager 330, moving body management database 331, and internal state analyzer 370 have been removed therefrom. Control center terminal 30A is, for example, used by an operator operating information presentation system 1. Control center terminal 30A, may, for example, be a computer.

Servicer terminal 40 includes moving body manager 330, moving body management database 331, and internal state analyzer 370 removed from control center terminal 30 according to the embodiment. Servicer terminal 40 is, for example, used by a servicer that provides the moving body including moving body apparatus 20. Servicer terminal 40, may, for example, be a computer.

Control center terminal 30A and servicer terminal 40 with the above configuration realize the same functionality as control center terminal 30 according to the embodiment by operating in coordination with each other while communicating. This enables information presentation system 1A to realize the same functionality as information presentation system 1 according to the embodiment.

The functionality realized by control center terminal 30 may, for example, be realized by distributed computing or cloud computing.

2) In the embodiment, presentation information generator 380 has been described as performing the presentation information generation process shown in FIG. 20. In contrast, presentation information generator 380 may also perform a variation presentation information generation process described below instead of the presentation information generation process.

Figure 28:
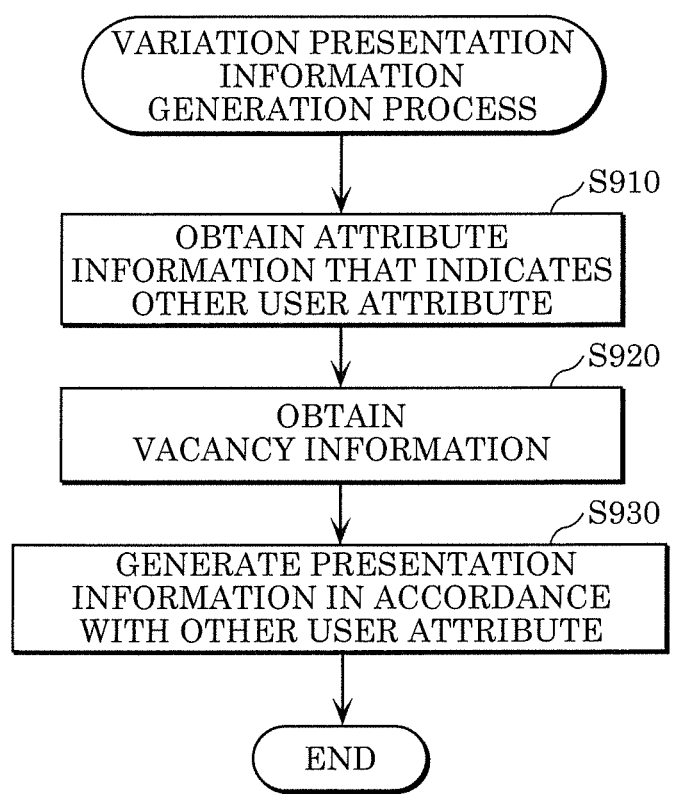
FIG. 28 is a flowchart of a variation presentation information generation process according to the other embodiment.

FIG. 28 is a flowchart of the variation presentation information generation process according to the other embodiment.

The variation presentation information generation process starts by, for example, ending the process of step S650 in the presentation process (see FIG. 18).

Upon starting the variation presentation information generation process, presentation information generator 380 obtains information that indicates an attribute of a user other than the user wishing to use the moving body (hereinafter also referred to as "other user") from the attribute information stored in user management database 391 (step S910).

Presentation information generator 380 next obtains the vacancy information from moving body management database 331 (step S920).

Presentation information generator 380 next generates, using information that indicates an other user attribute and the vacancy information, presentation information for the user wishing to use the moving body that indicates, in accordance with the other user attribute, the at least one of the vacant moving body and the seats in the moving body (step S930).

Upon ending the process of step S930, presentation information generator 380 ends the variation presentation information generation process.

3) A part or an entirety of the components included in control center terminal 30, user terminal 10, or moving body apparatus 20 may be one system large-scale integrated (LSI) circuit. System LSI is a multifunctional LSI in which a plurality of components are laminated on one chip, more specifically, is a computer system including a microprocessor, read-only memory (ROM), random access memory (RAM), and the like. A computer program is stored in the ROM. The microprocessor operates in accordance with the computer program, and the system LSI realizes this functionality.

Note that the system LSI may also refer to integrated circuit (IC), LSI, super LSI, or ultra LSI depending on degree of integration. The means for realizing the IC is not limited to LSI, but may also be realized by a dedicated circuit or a general-purpose processor. After manufacturing the LSI, a field-programmable gate array (FPGA) that can be programmed or a reconfigurable processor whose settings and connections of circuit cells in the LSI can be reconfigured may also be used.

Furthermore, when new technologies replacing LSI are introduced due to the advancement of semiconductor technology, these techniques may naturally also be used to integrate the function blocks. The present disclosure can possible also be used in biotechnology and the like.

4) An aspect of the present disclosure is not only such an information presentation system, but may also be an information processing method which turns the characteristic components included in the information presentation system into steps. An aspect of the present disclosure may be a computer program that causes a computer to execute each of the characteristic steps included in the information processing method. An aspect of the present disclosure may be a computer-readable, non-transitory recording medium containing such a computer program.

5) In the embodiment, each component may be realized by being dedicated hardware or being executed by a software program suited to each component. Each component may also be realized by a program executor, e.g. a central processing unit (CPU) or a processor reading and executing a software program stored on a recording medium, e.g. a hard disk, semiconductor memory, or the like.

6) In the above embodiment, an example in which the information processing system and information processing method according to an aspect of the present disclosure are used in a ridesharing service has been described, but is not limited thereto. For example, the above may also be used in a carsharing service and the like. To be specific, the second user may be matched as a user using the moving body that the first user has used instead of boarding the moving body together with the first user. In other words, the presentation information indicates a vacant moving body in accordance with the attribute of the first user that uses the moving body first. In this case, it is possible to limit the second user being displeased when using the moving body that the first user has used as an indirect result of the attribute of the first user (e.g. odor). Note that in the ridesharing service, the vacant body or the seats may be presented using the attribute of the user using the moving body first.

7) In the embodiment, control center terminal 30, having received the reservation request, may prepare the steps up to the dispatching of the moving body automatically based on the attribute information stored in user management database 391, and generate presentation information that indicates that the moving body has been dispatched.

Note that the processes performed by user information analyzer 360 and internal state analyzer 370 may also employ machine learning. Examples of machine learning include, for example, supervised learning in which a relationship between input and output is trained using labeled (output information) training data with respect to input information, unsupervised learning in which data structures are built from only unlabeled input, semi-supervised learning in which both labeled and unlabeled data are handled, and reinforcement learning in which successive actions are learned to maximize rewards by obtaining feedback (rewards) with respect to actions that are selected from state observation results. As a specific means of machine learning, there is the neural network (including deep learning using multi-layered neural networks), genetic programming, decisions trees, Beyasian network, support vector machine, and the like. In the present disclosure, any of the above specific examples may be used.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be widely used in a system employing moving bodies.

What is claimed is:

1. An information processing method, comprising the following executed by a computer:
    obtaining first attribute information that indicates an attribute of a first user concerning an internal space of a moving body, and vacancy information of at least one moving body;
    obtaining second attribute information that indicates an attribute of a second user concerning the internal space of the moving body;
    obtaining state information that indicates a state of the internal space of the at least one moving body by sensing the internal space of the at least one moving body;
    generating presentation information for the second user using the first attribute information, the vacancy information, and the state information, the presentation information indicating, in accordance with the attribute of the first user, at least one of a vacant moving body and vacant seats among the at least one moving body, and the state of the internal space corresponding to at least one of the attribute of the first user and the attribute of the second user; and
    causing a presentation apparatus to present the presentation information.

2. The information processing method according to claim 1,
    wherein the presentation information is generated in accordance with a relationship between the attribute of the first user and the attribute of the second user.

3. The information processing method according to claim 2,
    wherein the presentation information is generated, with a moving body reserved by the first user as subject, for which the relationship between the attribute of the first user and the attribute of the second user fulfils a predetermined condition.

4. The information processing method according to claim 2, comprising:
    wherein the presentation information is generated with a moving body reserved by the first user as subject, and indicates, in accordance with a degree of the relationship, the at least one of the vacant moving body and the vacant seats.

5. The information processing method according to claim 4, wherein
    the presentation information includes the first attribute information.

6. The information processing method according to claim 2, wherein
    the attribute of the first user and the attribute of the second user include a tolerance toward the state of the internal space of the moving body.

7. The information processing method according to claim 2, wherein
    the attribute of the first user and the attribute of the second user include an attribute of behavior that changes the state of the internal space of the moving body.

8. The information processing method according to claim 6, wherein
    the state of the internal space of the moving body includes at least one of dirt, odor, brightness, sound, vibration, and temperature.

9. The information processing method according to claim 2, wherein
    the attribute of the first user include a tolerance toward the state of the internal space of the moving body,
    the attribute of the second user includes an attribute of behavior that changes the state of the internal space of the moving body, and
    the presentation information is generated with a moving body other than a moving body reserved by the first user as subject when the attribute of the second user is the attribute of behavior that changes the state of the internal space of the moving body to a state that the first user has a low tolerance toward.

10. The information processing method according to claim 2, wherein
    the attribute of the first user includes an attribute of behavior that changes the state of the internal space of the moving body,
    the attribute of the second user includes a tolerance toward the state of the internal space of the moving body, and
    the presentation information is generated with a moving body other than a moving body reserved by the first user as subject when the attribute of the second user is the attribute of behavior that changes the state of the internal space of the moving body to a state that the first user has a low tolerance toward.

11. The information processing method according to claim 2,
    wherein the first attribute information is generated from a usage history of the at least one moving body by the first user; and
    the second attribute information is generated from a usage history of the at least one moving body by the second user.

12. An information processing method, comprising the following executed by a computer:

obtaining first attribute information that indicates an attribute of a first user concerning an internal space of a moving body, and vacancy information of at least one moving body;

obtaining second attribute information that indicates an attribute of the second user concerning the internal space of the moving body;

obtaining state information that indicates a state of the internal space of the at least one moving body by sensing the internal space of the at least one moving body;

generating presentation information for the second user using the first attribute information, the vacancy information, the second attribute information, and the state information, the presentation information indicating, in accordance with the attribute of the first user, at least one of a vacant moving body and vacant seats among the at least one moving body, the presentation information being generated in accordance with a relationship between the attribute of the first user and the attribute of the second user; and causing a presentation apparatus to present the presentation information, wherein the first attribute information is generated from (i) a usage history of the at least one moving body by the first user and (ii) the state of the internal space of the at least one moving body before and after usage by the first user; and the second attribute information is generated from (i) a usage history of the at least one moving body by the second user and (ii) the state of the internal space of the at least one moving body before and after usage by the second user.

* * * * *